Dec. 17, 1935.　　　M. ROMAINE ET AL　　　2,024,252
BROACHING MACHINE
Filed May 2, 1934　　10 Sheets-Sheet 3

Inventors
MILLARD ROMAINE
ERWIN G. ROEHM
By H. K. Parsons
Attorney

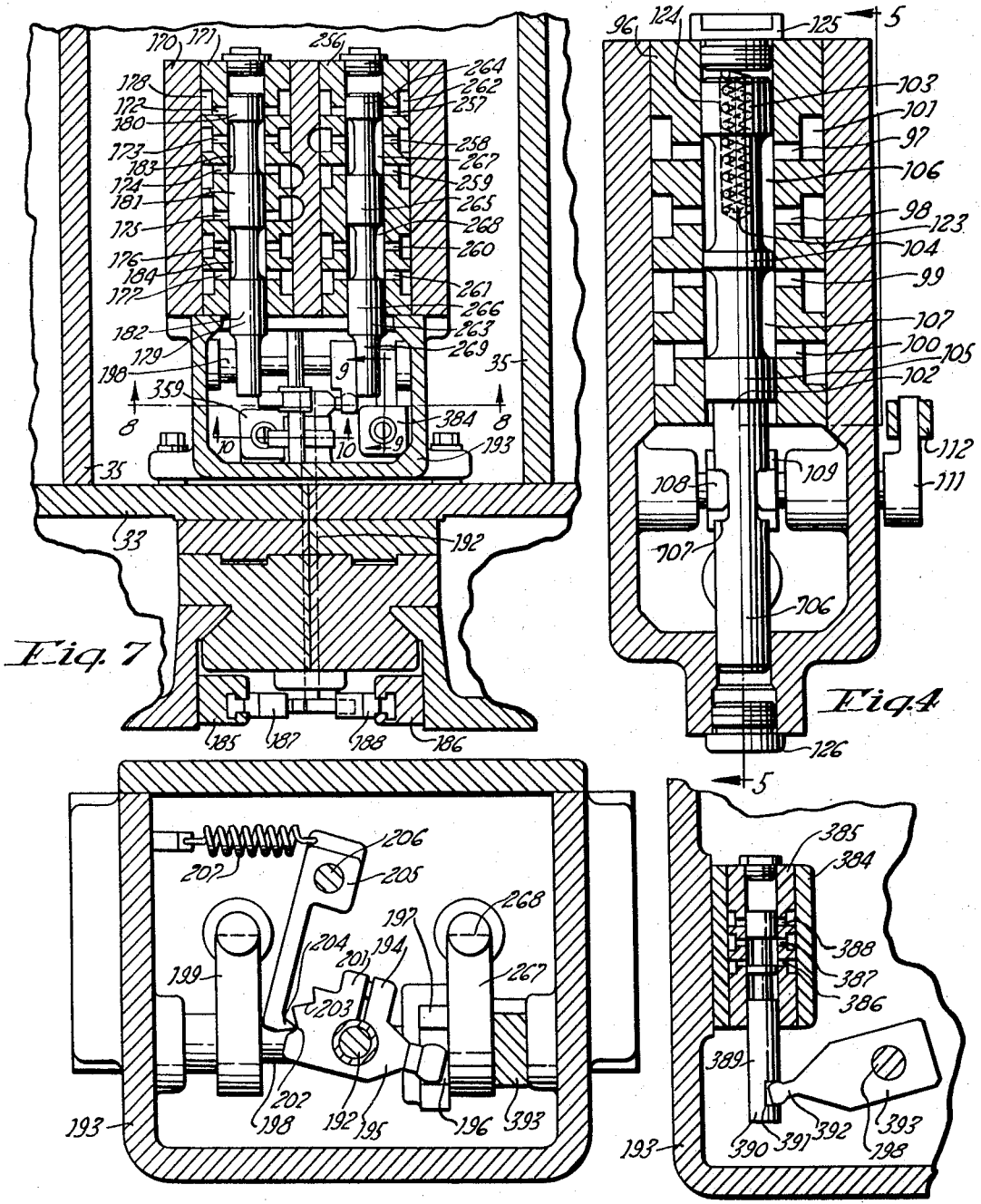

Inventors
MILLARD ROMAINE
ERWIN G. ROEHM
By A.H. Parsons
Attorney

Dec. 17, 1935.  M. ROMAINE ET AL  2,024,252
BROACHING MACHINE
Filed May 2, 1934  10 Sheets-Sheet 7
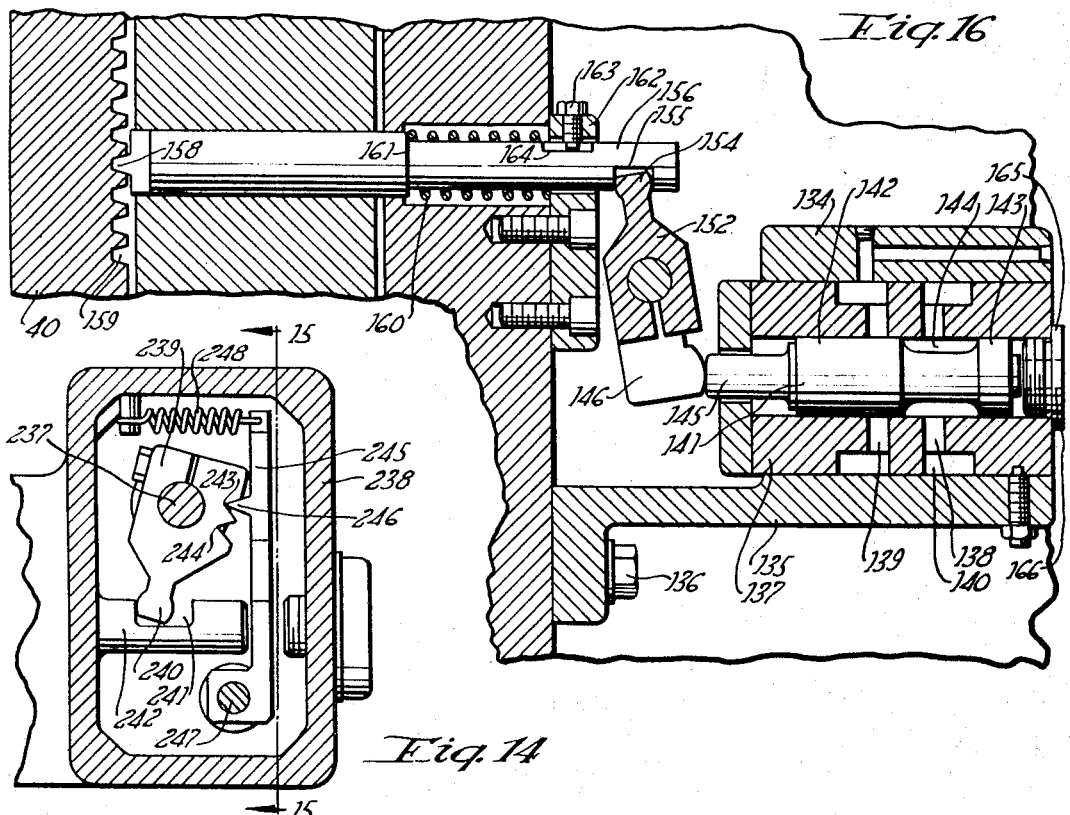
Fig. 16
Fig. 14
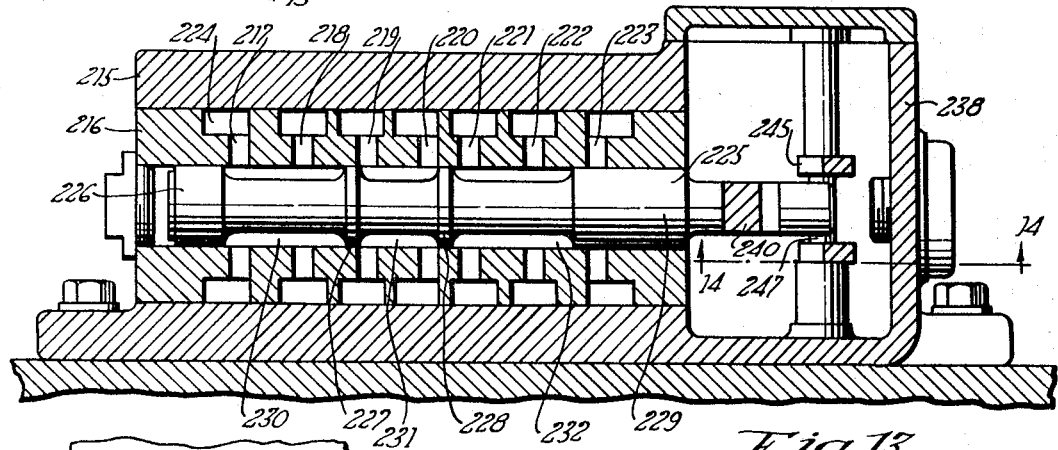
Fig. 13
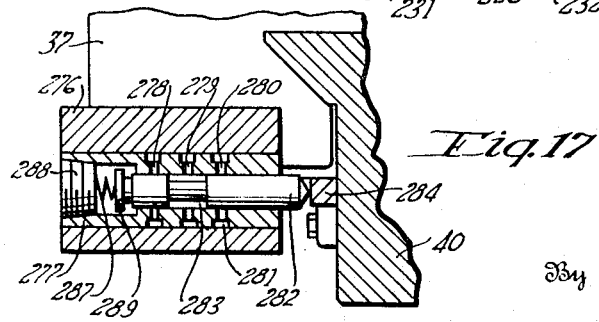
Fig. 17
Inventors
MILLARD ROMAINE
ERWIN G. ROEHM
By H. K. Parsons
Attorney Dec. 17, 1935. M. ROMAINE ET AL 2,024,252
BROACHING MACHINE
Filed May 2, 1934 10 Sheets-Sheet 8
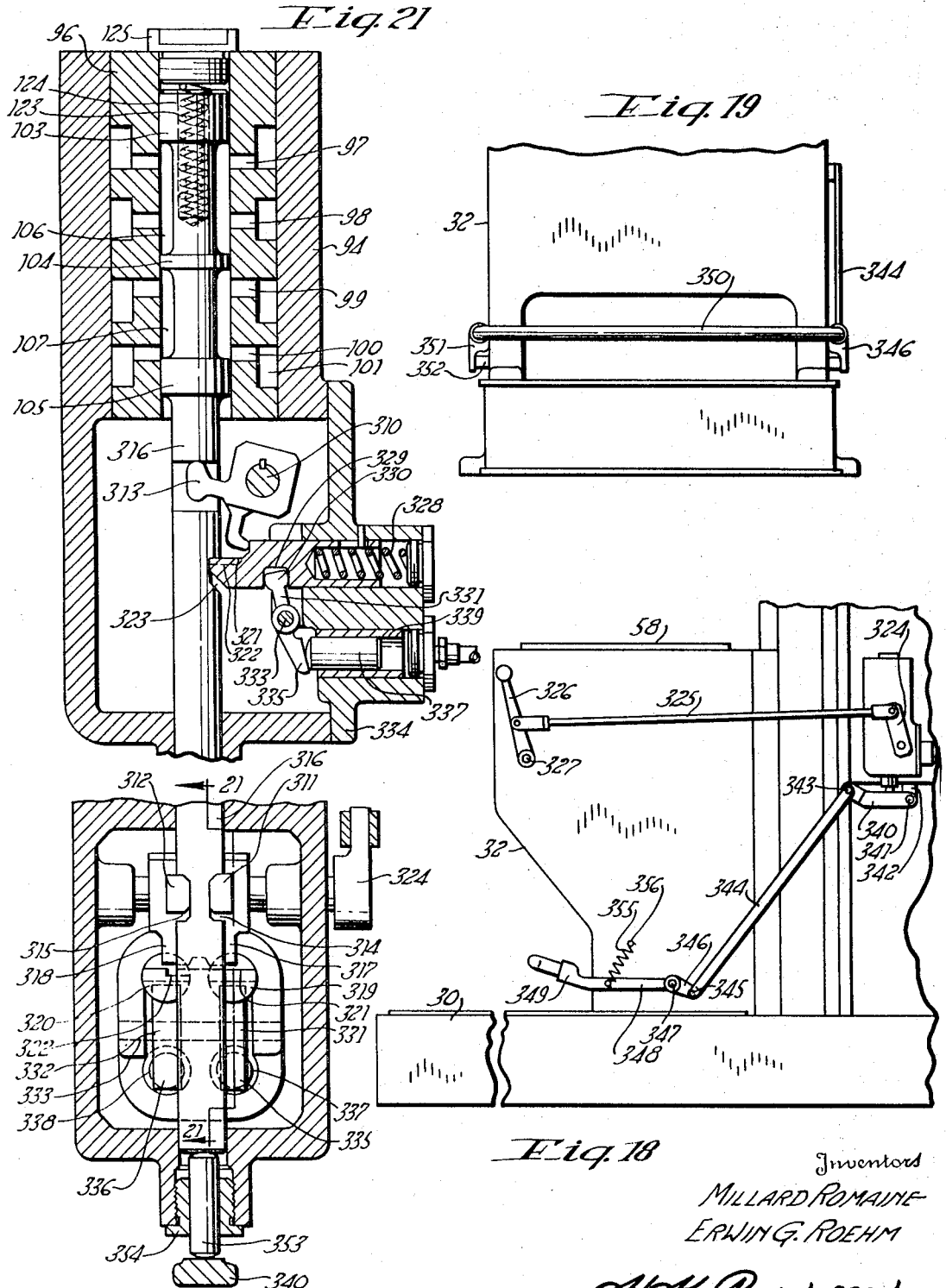
Inventors
MILLARD ROMAINE
ERWIN G. ROEHM
By AHKParsons
Attorney

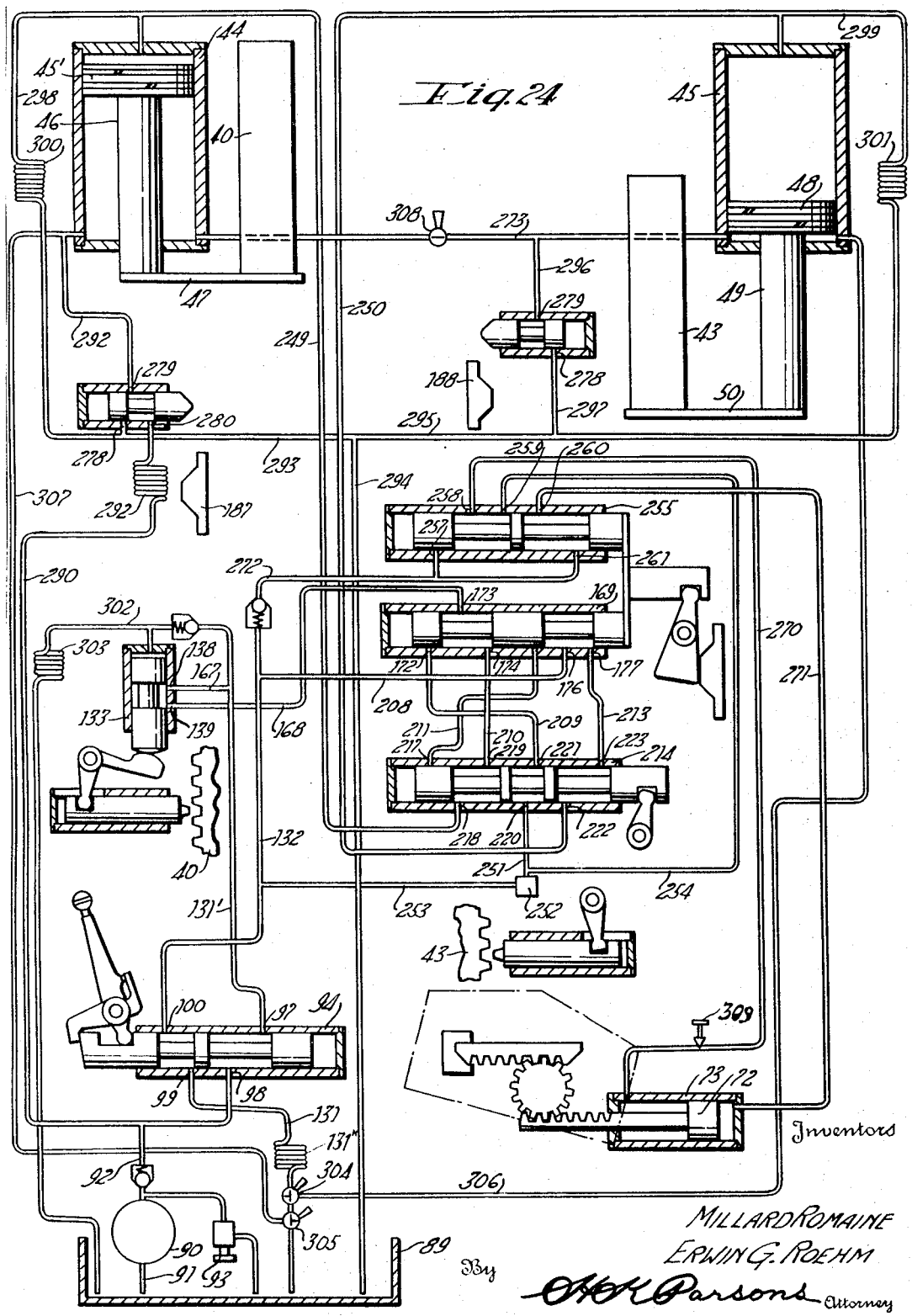

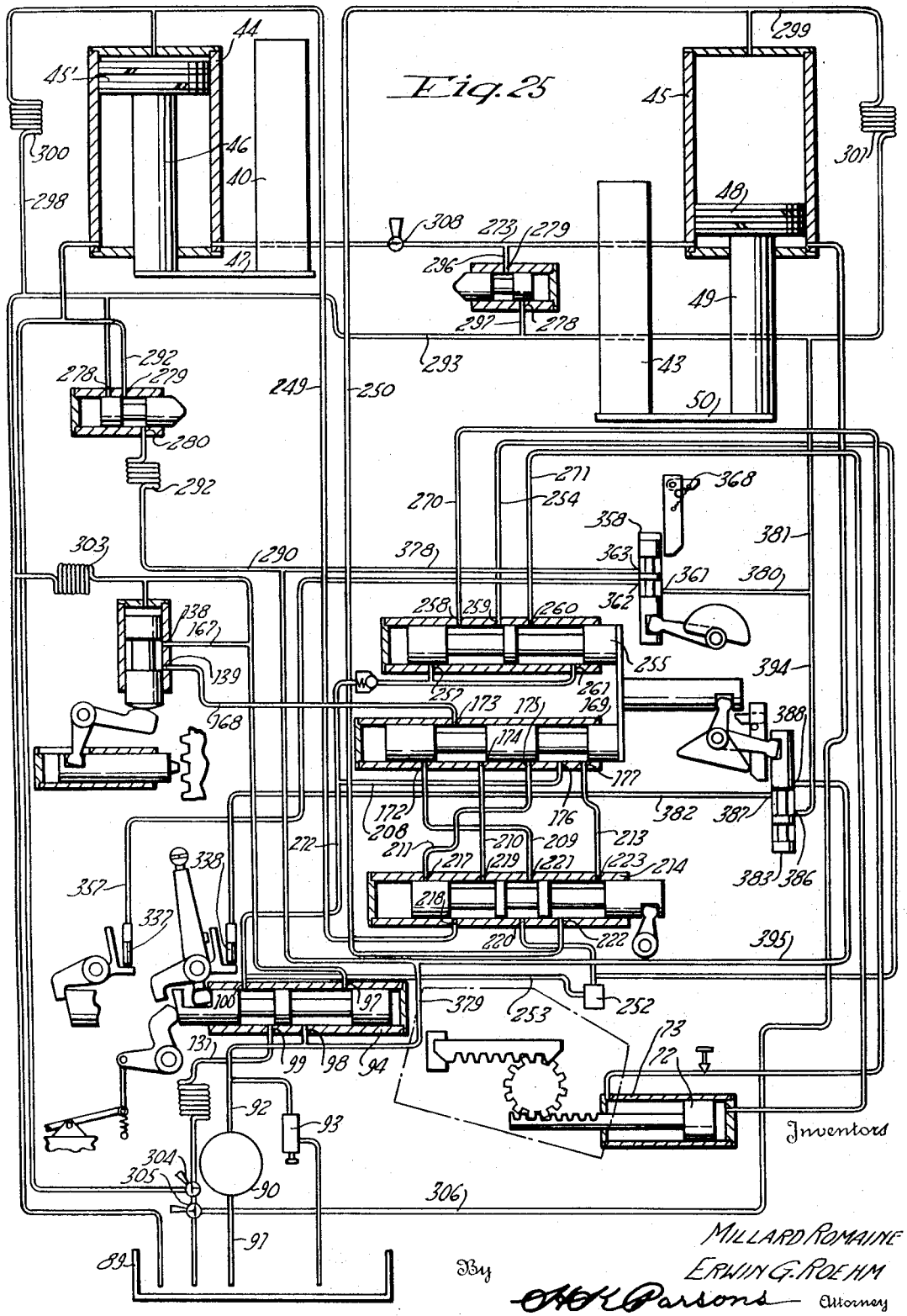

Patented Dec. 17, 1935

2,024,252

UNITED STATES PATENT OFFICE 2,024,252

BROACHING MACHINE

Millard Romaine, Cincinnati, and Erwin G. Roehm, Norwood, Ohio, assignors to The Cincinnati Milling Machine Co., Cincinnati, Ohio, a corporation of Ohio Application May 2, 1934, Serial No. 723,598

22 Claims. (Cl. 90—33)

This invention relates to improvements in machine tools and particularly to improvements in broaching machines.

An object of the invention is the provision of an improved hydraulically actuated duplex broach.

Another object of the invention is the provision of a broaching machine as above indicated which is automatic in its operation, that is, effects substantially continuous broaching.

A further object of the invention is the provision of an improved broaching machine of the above indicated type which may be operated in a continuous reciprocating cycle or may be intermittently operated, that is, a cycle which must be initiated intermittently at the conclusion of each work piece.

A still further object of the invention is the provision of a broaching machine of the duplex type in which the broach rams are locked in position when the machine is shut down to keep the broach rams in step with one another and in which the broach rams are always kept in step regardless of the duration of operation thereof.

It is also an object of the present invention to improve the control thereof and the operation of the work presenting table.

Other and detailed objects of the invention include the detailed construction of the machine, the arrangement of the parts with respect to one another and the co-operation of said parts for effecting the automatic control of the machine as a whole.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 4 is a sectional view through the starting and stopping valve, as seen from line 4—4 on Figure 1.

Figure 5 is a view, partly in section and partly in elevation, of the starting and stopping valve as seen from line 5—5 on Figure 4.

Figure 7 is a view taken at right angles to Figure 6 and illustrating the control valves as seen substantially from line 7—7 on Figures 2 and 6.

Figure 8 is a sectional view taken on line 8—8 of Figure 7.

Figure 9 is a sectional view taken on line 9—9 of Figure 7.

Figure 13 is a sectional view through the reversing valve controlled by the work table as seen from line 13—13 on Figure 11.

Figure 14 is a transverse sectional view of Figure 13 as seen from line 14—14 thereon.

Figure 15 is a view, partly in section and partly in elevation, as seen from line 15 on Figure 14.

Figure 16 is a sectional view through the ram lock as seen from line 16—16 of Figure 3.

Figure 17 is a fragmentary sectional view through a make-up valve forming a detail of the invention as seen from line 17—17 of Figure 2.

Figure 18 is a fragmentary elevational view showing the lower left hand portion of the machine as shown in Figure 1 with a modified control mechanism.

Figure 19 is a front elevation of the parts shown in Figure 18.

Figure 20 is a sectional view of the lower portion of the starting and stopping valve as shown in Figure 4 with the modified control mechanism utilized with the means shown in Figures 18 and 19.

Figure 21 is a sectional view of the modified starting and stopping valve taken at right angles to Figure 20 as is seen from line 21—21 on Figure 20.

Figure 24 is a diagrammatic view of the complete hydraulic circuit employed with a machine controlled by the means shown in Figures 1 and 2.

Figure 25 is a similar diagrammatic view showing the complete hydraulic circuit utilized with a modified machine utilizing the control means shown in Figures 18 to 21 inclusive.

Throughout the several views of the drawings similar reference characters are employed to denote the same or similar parts.

Figure 1:
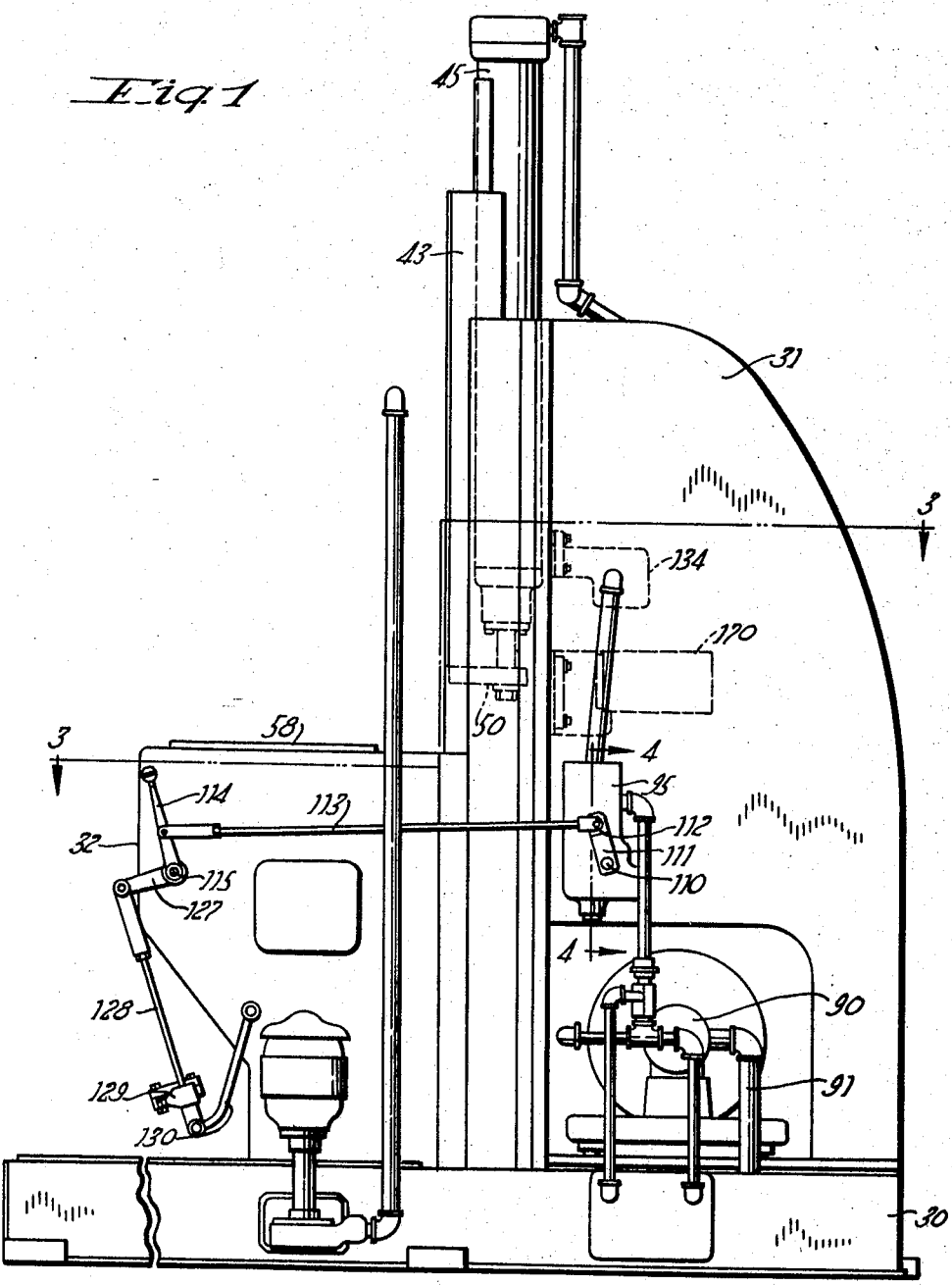
Figure 1 is a side elevation of the broach of the present invention.

As will be noted from the foregoing description of the drawings there are in reality two machines illustrated which are similar in substantially all respects, the one machine however having added thereto certain additional features which necessarily require additional control means. It might be pointed out at this time that the basic machine is shown in Figure 24 which is a substantially continuously operating machine of the duplex type including a starting and stopping valve which is manually initially positioned and remains so until manually released. In this machine, and as shown in the drawings, the manual release may be effected either by the same handle which initially set the valve or by additional means operated by the foot of the operator, and conveniently so by merely kicking a pedal plate or the like.

In the machine shown in Figure 25 additional control means are incorporated whereby the machine will stop after each cycle, unless reset by the operator prior to the completion of the ensuing cycle. In other words, the machine diagrammatically illustrated in Figure 25 is of the duplex type, the same as that shown in Figure 24 and in which one work piece is being located in its fixture while the other work piece is being tooled. If the operator has fully completed the loading operation prior to the completion of the tooling of the work piece being operated upon, he manually resets the starting and stopping valve either by a manual lever or more conveniently by a foot treadle. Upon the resetting of the valve the machine will automatically go through a second cycle and while going through this cycle will reset the machine automatically to stop at the conclusion thereof. The operator, however, can again set the parts to continue the automatic operation of the machine if he completes the clamping of the work in its fixture; otherwise he may permit the machine to automatically stop operating at the conclusion of the cycle.

In the following detailed description of the invention the basic machine shown in Figure 24 will be described first in its entirety and following this description the other machine will be described.

Figure 3:
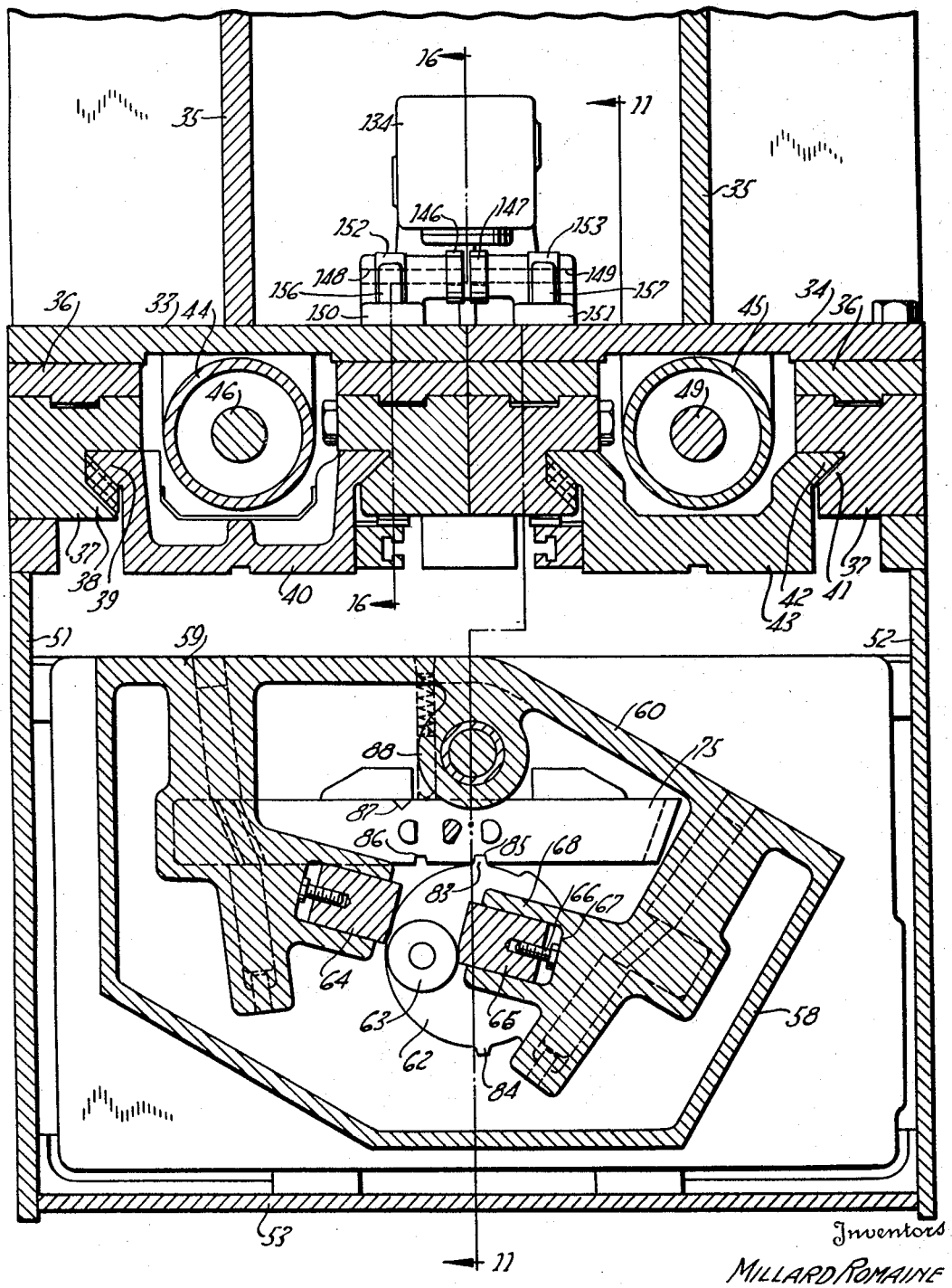
Figure 3 is a fragmentary staggered sectional view taken substantially on line 3—3 of Figure 1.

The broaching machine illustrated in the drawings comprise a rectangular base 30 having the interior thereof hollow and forming the coolant and hydraulic medium tanks. Rising above the base 30 is the column 31 shown in the drawings as of fabricated construction, that is, suitably formed of sheets of steel welded to one another. Forwardly of the column 31 and secured thereto is a knee or housing 32 which supports for movement relative thereto a work supporting table. The column 31, as seen in Figure 3, includes a pair of forward plate members 33 and 34 to which are welded the rearwardly extending ribs and sides 35. The plates 33 and 34 each have welded to their forward face strips 36, in turn supporting the members 37, longitudinally of which is formed a V shaped groove 38. The grooves in the members 37 carried by the plate 33 are opposed to one another to form a dovetail guideway in which is received a correspondingly shaped guiding tongue 39 formed on a ram 40. The members 37 carried by the plate 34 have the V grooves therein likewise in opposition to one another to form the dovetailed guide way 41 in which is disposed the dovetail guide 42 of a second ram 43.

The rams 40 and 43 are substantially U shaped in cross section which cooperates with the recess formed beneath said rams by the strips 36 and members 37 to provide an opening in which the ram's actuating means are disposed. Accordingly the space behind the ram 40 houses a cylinder 44, while the space behind the ram 43 houses a similar cylinder 45. As shown in Figure 24 the cylinder 44 encloses a piston 45' from which projects a piston rod 46. The free end of the rod 46 is connected by a tie-plate 47 with the lower end of the broach ram 40. Likewise, and as shown in Figure 24, the cylinder 45 encloses a piston 48 having projecting therefrom a piston rod 49 connected at its free end by a tie-plate 50 with the broach ram 43. From the foregoing it will be noted that the rams are operated by pistons, in turn operated by a hydraulic medium, preferably oil under pressure, and this operating mechanism will be described in detail later.

Figure 12:
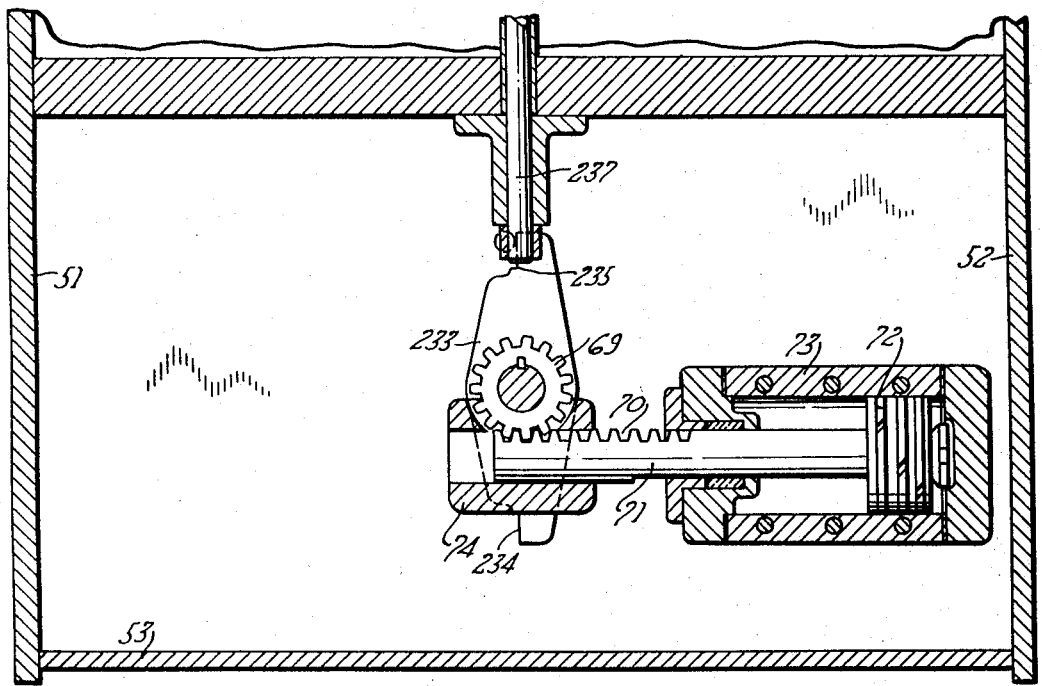
Figure 12 is a sectional view through a portion of Figure 11 as seen on line 12—12 on said Figure 11.
Figure 11:
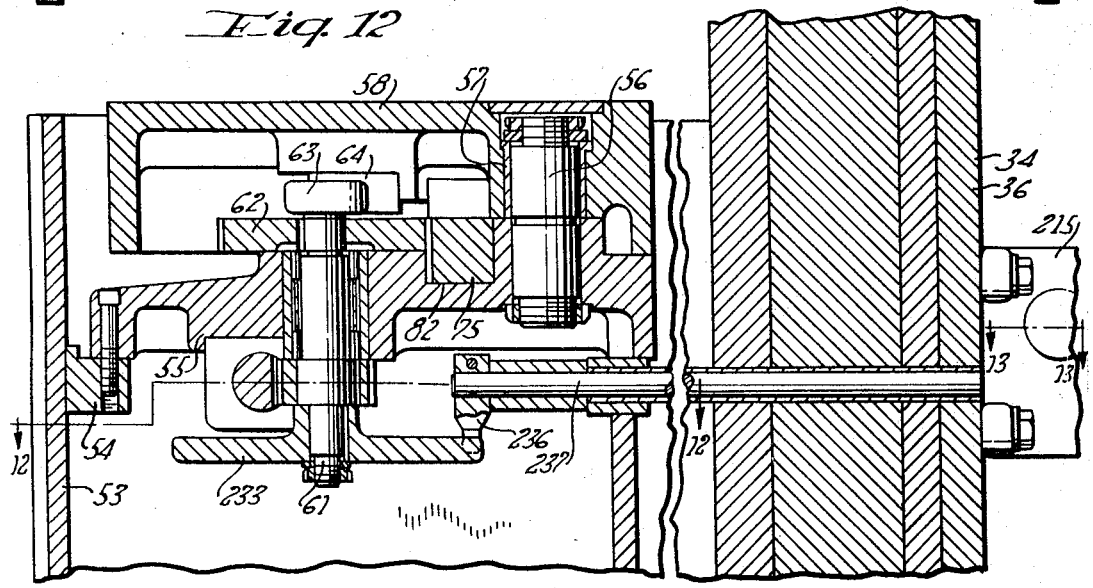
Figure 11 is a fragmentary vertical sectional view taken transversely of the machine through the work supporting table and column as seen from line 11—11 on Figure 3.
Figure 23:
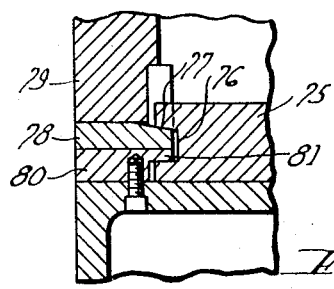
Figure 23 is a fragmentary sectional view of a table locking mechanism which may be utilized with either form of table shifting means and as seen particularly from line 23—23 on Figure 22.

The knee or table supporting housing 32, as shown in Figures 3, 11 and 12, comprises a pair of side plates 51 and 52 welded at their rear and lower edges to the column 31 and base 30. The forward edges of the plates 51 and 52 have welded between them a plate 53 thereby forming a boxlike housing. Welded to the inner surfaces of the side and front plates at a point below the upper edges thereof are lugs or blocks 54 to which is fastened in any suitable or desirable manner the supporting plate 55 which supports the work table and the mechanism for indexing same. Substantially centrally of the length of the plate 55 and near its rear edge it is provided with an aperture in which is secured a trunnion or pivot stud 56 extending thereabove and entering a bushed aperture 57 formed in the work supporting table 58. The work supporting table 58 is provided on its inner edge with oppositely inclined faces 59 and 60 adapted to be alternately aligned with the broach rams 40 and 43 during the operation of a work piece thereon.

The means for oscillating the table 58 comprises a shaft 61 rotatably journaled in the supporting plate 55 and having secured to its upper end a disc 62. The disc 62 carries eccentrically thereof a roller 63 disposed between abutments 64 and 65 carried by the table 58. As seen in Figure 3, the abutments 64 and 65 are in the form of blocks, each carrying at its inner end a screw 66 abutting against the base 67 of a socket formed in a lug 68 integral with the said table on its under surface. By reference to Figure 3 it will be appreciated that rotation of the disc 62 in a clockwise direction will cause the roller 63 to act on the abutment block 65 and oscillate the table 58 in a counterclockwise direction about the pivot stud 56. This movement of the table will bring the forward inclined face 59 thereof out of alignment with the ram 40 and will align the face 60 with the ram 43.

In order to effect the rotation or oscillation of the disc 62 the shaft 61 has keyed or otherwise secured to it a rack pinion 69 meshing with rack teeth 70 formed in a rod 71. The rod 71 carries at its other end a piston 72 enclosed within a cylinder 73 mounted within the knee or table housing 32 and secured to the undersurface of the supporting plate 55. The piston 72 is operated by the same hydraulic medium which effects the operation of the ram pistons as will be described in detail later. As seen in Figure 12, the piston rod 71 at the place which carries the rack teeth 70 is mounted for sliding movement through a bearing block 74 secured in any desirable manner to the undersurface of the supporting plate 55.

In each of the operative positions of the table 58 it is adapted to be securely locked or clamped. This clamping means comprises a bar 75 having a slot 76 formed in each end thereof. The slot 76 has one wall 77 inclined or tapered to the other wall and this inclination acts as a wedge when cooperating with a wedge plate 78 secured to the undersurface of the table 58 or a lug 79 depending therefrom. Beneath the wedge plate 78 is a plate 80 carried by the supporting plate 55 having a reduced lug or nose 81 which underlies the tapered portion of the wedge plate 78 for cooperating with the notch 76 in holding down or clamping the table 58. The clamping bar 75 is mounted for sliding movement in a guideway 82 formed in the upper surface of the supporting plate 55.

In the operation of the work supporting table the bar 75 is first moved to release the clamp thereof on the table, whereupon the oscillation of the table is effected. The means for shifting the bar 75, as shown in Figure 3, may take the form of a multilated gear since the movement of the bar will be considerably less than the movement of the table. This mutilated gear may conveniently take the form of a pair of lugs or gear teeth 83 and 84 formed on the periphery of the disc 62 and cooperating with notches 85 and 86 formed in the adjacent side of the bar 75. By reference to Figure 3, and assuming the work table 58 is to be oscillated from the position there shown to its second operative position, it will be seen that the first movement of the disc 82 through the gear tooth 83 and bar notch 85 will shift the said bar to the right, thereby breaking the lock at the left hand end of said bar. This will require but a small portion of a revolution of the disc 82 when the tooth 83 will leave the notch 85 and will not further shift the said bar 75. Upon completion of the indexing of the table 58, the tooth 84 will engage in the notch 86 and further shift the bar 75 to effect a locking thereof on its right hand end. Reverse oscillation or rotation of the disc 62 will naturally through the tooth 84 and notch 86 first release the right hand clamp, and subsequently the tooth 83, and notch 85 will complete the left hand clamp.

To avoid any possible interference by the bar 75 to the oscillation of the table 58, which might be caused by a coasting of the bar 75 when first shifted to break the lock, there is provided means for stopping the bar 75 in its central position. This means comprises a V groove 87 formed in the side of the bar 75 opposite to that in which the notches 85 and 86 are formed, which cooperates with a spring pressed plunger 88 carried by the supporting plate 55.

From the foregoing it will be noted that there has been provided a duplex type of broach utilizing a pair of hydraulically actuated broach rams, together with a work supporting table adapted to be indexed or oscillated to alternately present work pieces to the said broach rams. It should also be noted at this time that the movement of the broach rams in one direction is the cutting stroke, while movement in the opposite direction is the return or idle stroke. The work supporting table is indexed so as to present the unfinished work piece thereon to the broach ram which is moving through its cutting stroke and retracting the table from the ram which is moving through its idle stroke to permit a replacement of the finished work piece thereon. It will be appreciated that the movements of the ram and the oscillating or indexing of the table must take place in predetermined timed sequence. The means for effecting this sequential operation of these parts is shown diagrammatically in Figure 24 and structurally in the other figures. The operating cycle will therefore be described in connection with Figure 24 with a detailed description of the several control valves and their operating mechanism as they are encountered during the description of the circuit.

Accordingly, there is provided a sump or tank 89 which, as mentioned above, is enclosed within the base 30 of the machine. As seen in Figure 1 there is disposed above the base 30 a motor pump unit 90 connected by a suction pipe 91 with the tank 89. Extending from the other side of the pump 90 is a pressure conduit 92 having connected therein a relief valve 93 which determines the operating pressure in the pressure pipe or conduit 92. The pipe or conduit 92 terminates at the starting and stopping valve shown diagrammatically in Figure 24 and indicated in general by the numeral 94.

The starting and stopping valve 94 is structurally illustrated in Figures 4 and 5 and comprises a casing 95 secured to the side of the column shown in Figure 1. The casing 95 is provided through a portion of its length with a bore into which is pressed a valve bushing 96 having formed therethrough a plurality of sets of radial ports 97, 98, 99 and 100. Each set of radial ports is encircled by a similar circumferential groove 101 formed in the exterior of the bushing 96. Disposed within the bore through the bushing 96 is a valve member 102 of the slideable piston type having formed thereon piston portions 103, 104 and 105, forming between them cannelures 106 and 107. The valve 102 has two operative positions for connecting at one time the ports 97 and 98 with one another, and the ports 99 and 100, and in its second position for connecting ports 98 and 99.

In order to shift the valve to its operative or starting position, shown in the drawings, the valve 102 has projecting therefrom a stem 706 in which is formed one or more notches 707 receiving the arm 108 of a valve shifter 109. The valve shifter 109 is keyed or otherwise secured to a shaft 110 rotatably journaled in bearings provided by the valve casing 95. The shaft 110 projects beyond the casing 95 to receive a lever 111, in turn connected through a clevis 112 with a rod 113 which extends across the side of the column and table housing, as seen in Figure 1. The rod 113 is pivotally connected to a handle 114 pivotally mounted at 115 to the side of the table housing 32. From the foregoing it will be noted that movement of the handle 114 in a given direction, such as rearwardly, as seen in Figure 1, will through the rod 113 and lever 111 actuate the valve shifter 109 in a clockwise direction for shifting the valve 102 to the position shown in the drawings.

The pivotal connection 115 of the handle 114 is in reality a shaft which extends entirely across or through the knee of table housing 32 and projects beyond the other side thereof. The shaft 115 has keyed or otherwise secured to its second projecting end a second handle 116 whereby the valve may be operated from either side of the work table.

The valve 102 is normally locked in its open position for which purpose the valve stem 106 is provided with a second notch 117 receiving the nose 118 of a locking plunger 119. The locking plunger 119 is mounted for sliding movement in a lug 120 of a plug secured to the casing 95. The plunger 119 is further provided with a counterbore therein receiving a spring 121 which abuts on one end against the base of the counterbore and on the other end against the supporting plug.

When desired to shift the valve 102 to its second position the plunger 119 must be released, for which purpose the valve shifter 109 has depending therefrom a finger 122 engaging with the plunger 119 for shifting same against the resistance of spring 121. To permit the shifting of the plunger 119 before forcibly shifting the valve 102 there is provided lost motion between the valve shifter arm 108 and the walls of the notch or notches 107 in the valve stem 106. It will be appreciated that movement of the valve shifter 109 in a counterclockwise direction, due for example to a forward movement on the handle 114 or 116, will first withdraw the locking plunger 119, at which time the lost motion between the valve shifter arm 108 and valve stem notch 107 is taken up, whereupon the valve 102 may be shifted.

In practice, however, the valve 102 is automatically shifted upon release of the locking plunger 119 and is only manually shifted in the event of a sticking thereof or a failure of the automatic operating means. This automatic operating means comprises a spring 123 disposed in a counterbore 124 formed in the upper end of the valve 102, as seen for example in Figure 4. The spring 123 abuts on one end with the base of the counterbore 124 and on the other end with a plug 125 which closes the end of the valve bushing 96. The movement of the valve by the spring 123 is limited by a plug 126 carried by the valve housing 95 at a point below but in alignment with the valve stem 106. As was mentioned above, when the machine is once set in motion, as by shifting the starting valve to its operative position, it is normally retained therein and this valve is only shifted therefore in case of an emergency or when shutting down the machine and, as mentioned above, in order to shift the valve to its stopped position it is only necessary to withdraw the retaining plunger 119 whereupon the valve is automatically shifted.

The emergency requiring the shutting down of the machine may occur from various reasons or circumstances, one of which would be if the operator had not completed the clamping of the second work piece in its fixture while the other is being operated upon. Under these circumstances the operator's hands might both be engaged in attempting to complete the clamping of the work in the fixture requiring him to desist in his work in order to engage one of the handles 114 or 116. This, as will be appreciated, may be very inconvenient or practically impossible, wherefore there has been provided in this machine additional means which are manually operated as by the foot of the operator.

Figure 2:
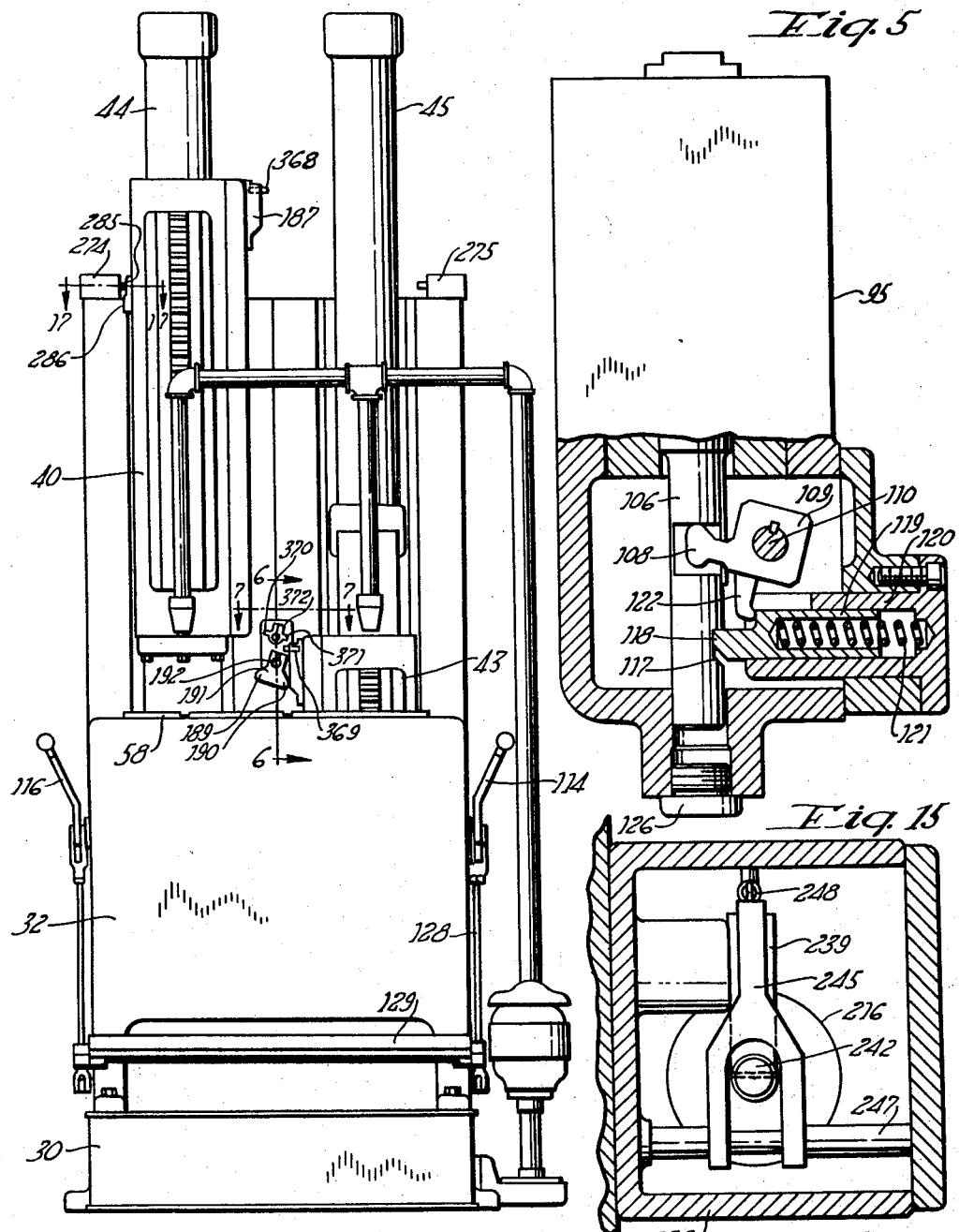
Figure 2 is a front elevation of the broach as seen particularly from the left hand side of Figure 1.

This means, as shown in Figures 1 and 2, comprises a second arm 127 secured to the shaft 115 adjacent each of the handles 114 and 116. The arms 127 are connected at their outer ends by links 128 to a treadle or plate 129 lying just above the base 30. The lower ends of the links 128 are connected by levers 130 to the sides of the knee or table housing 32. Since the operator stands on the base 30 while loading and unloading the machine, the treadle or plate, which may be called a kick plate, is within close proximity to his foot. It will be seen that pressure on said plate or a kick thereon will rearwardly shift the same, thereby causing the arms 127 to oscillate downwardly or counterclockwise relative to the axis of the shaft 115. This movement will correspondingly actuate the shaft 115 and therefore the handles 114 and 116 and parts operated thereby, as above described, for withdrawing the locking plunger 119, and permitting a shifting of the starting and stopping valve to its stopped position.

Referring now to Figure 24 it will be seen that the upper terminus of conduit 92 is connected with the ports 98 of the starting and stopping valve, while the ports 99 have connected therewith one end of a pipe or conduit 131 which terminates in a sump or tank 89 and this pipe or conduit is the main discharge conduit or may be termed the low pressure side of the system and contains the choke coil 131'' which maintains a low back pressure in the system. The ports 97 have connected therewith one terminus of a pipe or conduit 131' which is the main pressure line to the several control valves, while the ports 100 have connected therewith the main return conduit 132, which in the different positions of the control valves is on the low pressure side of the system.

The pressure conduit 131' terminates at a piston-valve mechanism indicated generally in Figure 24 by the numeral 133 which controls the operation of the rams' locks. This mechanism is shown structurally in Figures 3 and 16, the latter of which shows the piston-valve. As there shown, there is provided a casing 134 integral with a bracket 135 secured to the rear surfaces of the column plates 33 and 34 as by bolts 136. Mounted in the bore in the casing 134 is a bushing 137 having formed therethrough two sets of radial ports 138 and 139, each set being connected by a circumferential groove 140 formed in the exterior of the bushing 137. Mounted in the bore through the bushing 137 is the piston-valve member 141, having formed thereon piston portions 142 and 143. Between the said piston portions 142 and 143 the piston-valve is provided with a cannelure 144 for connecting the ports 138 and 139 when in the position shown in Figure 24 and for closing off the ports 139 when in the position shown in Figure 16.

Projecting from the piston portion 142 is a plug 145 at all times contacting with the lower ends of a pair of levers 146 and 147, the two levers being shown in plan in Figure 3. The levers 146 and 147 are respectively keyed or otherwise secured to shafts 148 and 149 respectively journaled in brackets 150 and 151 secured to the rear surfaces of the plates 33 and 34. The shafts 148 and 149 respectively have secured to their outer ends levers 152 and 153, each having a ball end 154, the latter of which is being shown in Figure 16. The ball ends of said levers are received in similar transverse notches 155 formed in the outer ends of locking plungers 156 and 157. The plungers 156 and 157 are each provided on their inner ends with a tooth 158 adapted to enter the space between adjacent rack teeth 159 formed on the rear surface of the rams 40 and 43. For this purpose the column plates 33 and 34, strips 36 and guide bars 37 are provided with aligned apertures through which the plungers 156 and 157 axially shift. The aperture through the column plates 33 and 34 is somewhat enlarged as respects the diameter of the plunger passing therethrough, and disposed within each of said enlarged apertures is a coiled spring 160 abutting on one end with a shoulder 161 formed on each of said plungers and on the other end with a plate 162 which is the base plate for the shaft brackets. The said plates 162 additionally carry a set screw 163 cooperating with a keyway 164 in the plungers 156 and 157 to prohibit any rotative movement thereof and thereby insuring the proper positioning of the said plunger teeth with respect to the ram racks.

This mechanism is utilized for holding the rams in proper relative position to one another when there is no pressure in the operating system, that is, when the machine is shut down. It will, therefore, be appreciated that before the rams can be actuated relative to the columns the locking plungers must be withdrawn. Use is therefore made of the piston-valve member 141 for withdrawing the locking plungers and as soon as they are withdrawn for connecting the pressure with the remaining part of the system. In order, therefore, to actuate the said piston-valve member 141 the bore through the valve bushing is closed at its right end by a plug 165 through which is formed a port 166 for connection with the upper end of the pressure conduit 131'. Pressure flowing through the conduit 131' will act on the end of the piston-valve member 141 and urge same inwardly as shown in Figure 16, or downwardly as shown in Figure 24, thereby through the levers 146 and 147 and arms 148 and 149 shift the locking plungers to the released positions shown in Figure 24. At this time the cannelure 144 of the said piston-valve member connects the radial ports 138 and 139, also as shown in Figure 24.

The ports 138 have connected therewith one end of a branch pressure conduit 167 which extends from the main pressure conduit 131. The ports 139 have connected therewith one end of a conduit 168 which terminates at its other end in a valve mechanism indicated generally in Figure 24 by the numeral 169. This valve mechanism 169 may be termed a pilot valve for controlling the distribution of the hydraulic pressure to the rest of the hydraulic circuit or system.

The pilot valve 169 comprises a valve casing 170 having pressed into a bore therein a valve bushing 171. The valve bushing 171 is provided with a plurality of sets of radial ports 172, 173, 174, 175, 176 and 177, each set being connected by a similar circumferential groove 178 formed in the exterior of the bushing 171. Slidable through the bore in the bushing 171 is a piston type valve 179 having formed thereon piston portions 180, 181, and 182 for forming therebetween cannelures 183 and 184. The cannelures are adapted to connect the radial ports in different combinations, depending upon the position of the valve relative to the valve bushing.

The valve member 179 has two positions, one position being that shown in Figures 7 and 24 and the other position being to the left of that shown in Figure 24 and above that shown in Figure 7. The valve is adapted to be automatically shifted by the rams during their movement relative to the column and particularly so when the rams reach the lower point in their travel. In other words, the valve is shifted to the position shown when one ram reaches its lowermost position and to the opposite position when the other ram reaches its lowermost position.

To effect this shifting of the valve member 179 each ram respectively carries on adjacent faces a dog rail 185 and 186 in which is adjustably, respectively secured dogs 187 and 188. The said dogs, see Figure 2, respectively engage ears 189 and 190 on a valve actuator 191. The valve actuator 191 is secured to the outer end of a rod 192 rotatably journaled in the column and face plates and extending therethrough.

Between the valve casing 170 and the column face plates there is disposed a housing 193 into which the inner end of the rod 192 projects, as well as the valve actuating mechanism operated by the rod 192. Secured to the rod 192 within the housing 193 is a lever 194 having an arm 195 received in a transverse slot 196 in the outer end of a lever 197. The lever 197 is keyed or otherwise secured to an oscillatable shaft 198 rotatably journaled in suitable bearings provided by the walls of the housing 193. From the foregoing it will be noted that oscillation of the rod 192 by the ram dog will through the arm 195 on said rod and the lever 196 effect the oscillation of the shaft 198.

Keyed or otherwise secured to the oscillatable shaft 198 near one of the bearings thereof is a valve shifter 199 having its free end disposed in a slot 200 formed in the under surface of a stem 201 projecting from the valve member 179. In order to determine the operative positions of the valve member 179 the lever 195 has integral therewith or secured thereto a web 201 in which is formed a pair of adjacent notches 202 and 203 which cooperate with a nose 204 of a detent member 205. The detent member 205 is loosely mounted on a rod 206 extending transversely of the housing 193. A spring 207, having one end connected to the detent 205 and its other end connected to the housing 193, maintains the nose 204 in contact with the plate or web 201. The detent 205 and web or plate 201, in addition, constitute a load and fire mechanism for effecting the rapid shifting of the valve when the nose 204 of the detent passes over the point between the V notches 202 and 203.

As will be seen from Figure 24 the pressure line 168 connects with the ports 173 of valve bushing 171, while the ports 176 thereof have connected therewith one terminus of a pipe or conduit 208 which empties into the main return conduit 132. Connected with the remaining ports 172, 174, 175 and 178 is respectively one terminus of pipes or conduits 209, 210, 211 and 213 which terminate at their other end in a valve mechanism indicated generally in Figure 24 by the numeral 214. This valve mechanism 214 is the reversing valve which controls the alternate connection of the pressure medium to the ram pistons 45 and 48.

The valve mechanism 214 is shown structurally in Figure 13 and comprises a valve casing 215 secured to the rear surface of the column plates 33 and 34 at a point below the vertical center thereof since this valve is operated by mechanism under the control of the work supporting table as will later be described. Pressed into a bore through the valve casing 215 is a valve bushing 216 having formed therethrough a plurality of sets of radial ports 217, 218, 219, 220, 221, 222 and 223, each set being encircled by a similar circumferential groove 224 formed in the exterior of the bushing 216. Disposed within the bore in the bushing 216 is a valve member 225 of the sliding piston type and having formed thereon piston portions 226, 227, 228 and 229 forming therebetween cannelures 230, 231 and 232 which connect the several sets of radial ports in different combinations, depending upon the position of the valve member 229.

As was noted above, this valve controls the operation of the ram pistons and insures the complete indexing of the work table prior to the operation of the said rams. The valve is therefore actuated by the table. The means for effecting the operation thereof comprises a double arm 233, keyed or otherwise secured to the shaft 61 for movement therewith. The arm 233 has formed at opposite ends thereof shoulders 234 and 235 for alternately engaging the ball end of a lever 236 secured to the outer end of a rod 237, said rod 237 being mounted for oscillation in bearings provided by the column and work supporting housing. As will be appreciated, the table is oscillated at the conclusion of each work piece, the shaft 61 for effecting this operation being actuated through 180°. From this it follows that the arm 233 is oscillated through an arc of 180° and effects the reverse movement of the lever 236 and consequently reverse oscillations of the rod 237.

The rod 237 extends beyond the rear surface of the column into a housing 238 integral with or secured to the valve casing 215 and to which is secured a valve actuator 239. The valve actuator 239 has its ball end 240 disposed within a slot 241 formed in the stem 242 projecting from the valve member 225. The valve 225 has two operative positions, that shown in Figure 13, and a second position to the right thereof. In order to determine said positions and to insure the valve being properly positioned the valve actuator 239 is provided on one side thereof with a pair of adjacent V shaped notches 243 and 244. Cooperating with the said notches is a detent or firing dog 245 having a nose 246. The dog 245 is loosely mounted on a shaft 247 carried by the housing 238. The nose 246 of the dog 245 is yieldably held in contact with the valve actuator 239 by a spring 248 having one end thereof secured to the upper end of the dog 245 and its other end attached to a fixed part of the housing.

From the foregoing it will now be seen that the valve mechanism 214 is under the control of the oscillatable work table and is shifted alternately to its operative positions upon alternate oscillation thereof.

As will be seen from Figure 24 the ports 217, 219, 221 and 223 of the bushing have respectively connected therewith the other ends of the pipes or conduits 211, 210, 209 and 213. Connected with the ports 218 is one end of a pipe or conduit 249 which terminates at the upper end of the cylinder 44, while the ports 222 have connected therewith one end of a pipe or conduit 250 which terminates at the upper end of the cylinder 45. Connected with the remaining ports 220 is one end of a conduit 251 terminating at its other end in a pressure relief valve 252, the latter being in turn connected by a pipe or conduit 253 with the main return conduit 132. The purpose of the relief valve 252 is to lower the pressure in the conduit 251 whereby a lower pressure is utilized for effecting the oscillation of the work supporting table.

Extending from the conduit 251 from a point ahead of the relief valve 252 is a pipe or conduit 254 terminating in the valve mechanism indicated generally in Figure 24 by the reference character 255. This valve mechanism 255 controls the reverse oscillation of the work supporting table and may therefore be termed the table reversing or indexing valve.

The valve mechanism 255 is shown structurally in Figure 7 and is mounted in the same casing as the distributor valve mechanism 169. Therefore, and as shown in Figure 7, the valve casing 170 is provided with a second bore in which is pressed a valve bushing 256 having formed therethrough a plurality of sets of radial ports 257, 258, 259, 260 and 261, each set of ports being encircled by a similar circumferential groove 262 formed in the exterior of the bushing 256. Disposed within the bore in the bushing 256 for sliding movement relative thereto is a valve member 263 having formed thereon piston portions 264, 265 and 266, forming between them cannelures 267 and 268. The said cannelures are adapted to connect the several sets of radial ports in different combinations, depending upon the position of the valve member 263.

The valve member 263, similar to the valve member 179, has two operative positions which positions are substantially similar to the positions of the valve 179. In fact, the valve members 179 and 263 are simultaneously actuated through the same mechanism as above described for shifting the valve 179 and under the control of ram dogs 187 and 188. While the same operating or control means is employed a separate shifter arm is in fact utilized for actually shifting the valve member 263. This separate arm is shown in Figure 8 at 267, being secured to the shaft 198 which carries the arm 199 for the valve 179. The upper end of the arm 267 is disposed in a slot 268 formed in the stem 269 projecting from the valve member 263.

From the foregoing it is believed now evident that the said distributor valve and indexing valve are simultaneously shifted for first stopping the movement of the rams and then effecting the oscillation or indexing of the work table.

Again referring to Figure 24 it will be seen that it is with the ports 259 of the bushing 256 that the reduced pressure conduit 254 connects, while the ports 258 and 260 have respectively connected therewith one end of pipes or conduits 270 and 271 which respectively terminate at their other ends at the left and right hand ends of the table operating cylinder 73. Connected with the ports 257 and 261 are branch discharge conduits, each connected with a pipe or conduit 272 which empties into the main return conduit 132.

The lower ends of the ram cylinders 44 and 45 are connected with one another by a pipe or conduit 273 whereby when one of the pistons is descending the exhaust therefrom causes the ascension of the other. To prevent the pistons from getting out of time with one another, that is, to insure that the pistons each reach their upper limit of travel, there is provided what may be termed a make-up valve for each cylinder to take care of any leakage past the pistons or the leakage in the said piston circuits. These make-up valves are located at the upper end of the supporting column on the outer sides of the pistons. The said valves are shown in Figures 2 and 24 by the reference numerals 274 and 275, one of which, namely 274, is shown structurally in Figure 17. As there shown, the valve 274 comprises a casing 276 in which is pressed a valve and bushing 277 having formed therethrough a plurality of sets of radial ports 278, 279 and 280. Each set of radial ports is encircled by a similar circumferential groove 281 formed in the exterior of the bushing 277. Mounted in the bore in the bushing for sliding movement relative thereto is a valve member 282 having formed thereon a reduced portion 283 forming a cannelure which connects the ports 278 and 279 with one another or the ports 279 and 280, or takes a position in which one of the ports is connected, as shown for example in Figure 17. The valve is actuated in one direction, namely, towards the left as seen in Figure 17, by a dog 284 secured to the adjacent side of the ram so as to actuate same when the ram is in or near its uppermost position. The dog 284, as seen in Figure 2, has a pair of cam faces 285 and 286, the former shifting the valve to the position shown in Figure 17, which is a neutral position, and the latter further shifting the valve to connect the ports 278 and 279 for a purpose which will later be made clear. The shifting of the valve member 282 by the dog 284 is against the resistance of a spring 287 which abuts on its inner end with the end of the valve member 282 and on its outer end with a plug 288 threaded into the end of the bushing 277. The spring 287 is utilized for outwardly shifting the valve member 282 when the dog 284 is out of alignment therewith. To limit this outward movement of the valve 282 by the spring 287 the said valve 282 carries a head or flange 289 which engages a fixed shoulder on the valve bushing 277.

Connected with the ports 280 is one end of a pipe or conduit 290 of a relatively small bore which is connected at its other end to the main pressure pipe or conduit 92. Included in the said conduit 290 is a choke coil 291 which, together with the small bore of the pipe 290 hold the pressure entering the valve member through the port 280 to a relatively low point, in fact, a point which is ineffective to interfere with the normal operation of the circuit except when the rams are supposed to be at the ends of their strokes and therefore stopped. Connected with the ports 279 is one end of the pipe or conduit 292, which has its other end connected to the lower end of the cylinder 44 for conveying the pressure to the said cylinder when the ports 279 and 280 are connected as shown in Figure 24. Connected with the ports 278 is one end of the conduit 293 which empties into a conduit 294, in turn connected with the sump or tank 89.

The operation of the make-up valve is such that should the piston 45 be at its supposed upper limit of movement without the cam portion 285 reaching the valve member 282 the parts will remain in the position shown in Figure 24, that is, with the ports 279 and 280 connected, wherefore oil will flow through the pipes 290 and 292 into the cylinder 44 for further elevating the piston 45. This will continue until the said dog cam face 285 engages the valve member 282 and shifts same to the position shown in Figure 17, thereby cutting off any flow through the port 280 and stopping the movement of the ram piston 45. Should, however, during the normal operation of the machine the piston rise to such a point as to bring the cam face 286 of the dog 284 into engagement with the valve member 282, the said valve member will then be shifted to the left, as seen in Figure 17, to the limit of its movement, thereby connecting ports 278 and 279. This then connects the cylinder 44 to the conduit 292 and conduits 293 and 294 with the sump 89, allowing the piston 45 to descend by gravity through a sufficient distance to lower the dog 284 and permit the valve member 282 to shift to the position shown in Figure 17 with the said member in engagement with the cam face 285, whereupon again flow will be stopped in either direction relative to the cylinder 44 and hold the piston in its proper position.

The other make-up valve 275 operates in a similar manner to that just described for the make-up valve 274 except that actual make-up fluid does not pass therethrough, use being made of the valve 274 for the supply. The ports 279 of this valve 275 are connected by a pipe or conduit 296 with the pipe or conduit 273 which enters the lower end of the cylinder 45. while the ports 278 are connected by a conduit 297 with the discharge conduit 294.

The upper ends of the cylinders 44 and 45 are respectively connected to one end of small bore pipes or conduits 298 and 299 and conduits 293 and 297 and therefore the sump conduit 294. Each of the pipes 298 and 299 respectively include a choke coil 300 and 301 and these coils, together with their pipes or conduits, constitute an air bleed from the highest point of the hydraulic circuit for insuring the proper functioning of the system and for removing any possibility of voids in the said system which would materially interfere with the smooth working of the circuit.

The upper end of the piston-valve mechanism 133 is connected by a pipe or conduit 302 containing a choke coil 303 with the sump or tank 89. This pipe or conduit permits the exhaust of the hydraulic medium above the piston when the same is returned to its outward position by the spring 160 during the setting of the locking plungers. The pipe 302 is of a small bore, which taken with the choke coil 303, prevent any serious loss of pressure in the system which is flowing through the pipe 131 to the upper end of the piston-cylinder mechanism 133.

In the course of operation of the machine one or the other of the rams may become jammed, requiring the reverse operation thereof without completing its complete cycle. The causes for this jamming may be several, one of which would be the improper clamping of a work piece prior to the operation thereon. With the machine as thus far described, no means are provided to effect this reverse operation of one or the other of the rams. However, to overcome this difficulty the following mechanism is provided. Upon shifting of the starting and stopping valve mechanism 94 to the stopped position, that is, to the left as shown in Figure 24, the ports 98 and 99 are connected, thereby short circuiting the pump 90 with the tank 89. Disposed in the discharge pipe or conduit 131 between the starting and stopping valve mechanism 94 and the sump or tank 89 is a pair of three-way valves 304 and 305. the former being connected by a pipe or conduit 306 with the lower end of the cylinder 45, while the later is connected by a pipe or conduit 307 with the lower end of the cylinder 44. Located in the pipe or conduit 273 connecting the lower ends of said cylinders is a two-way valve 308.

Assuming now that the piston 45' in the cylinder 44 becomes jammed and must be reversed, the starting and stopping valve is first thrown to its stopped position, thereby throwing the high pressure into the conduit 131. The two-way valve 308 is then actuated to cut off communication between the cylinders 44 and 45, whereupon the three-way valve 305 is positioned to direct the pressure from the conduit 131 into the conduit 307 to the lower end of the piston 45 and effecting its upward movement. This, of course, will continue if the valve 305 is not shut off until the make-up valve member is shifted to the position effected by dog cam face 206 to connect the cylinder with the sump. If it is assumed that it is the piston 48 which is stuck the starting and stopping valve 94 and the two-way valve 308 are positioned as above described but instead of the three-way valve 305 being used, valve 304 is employed, thereby connecting the pressure into conduit 306 and reversing the movement of the piston 48.

The normal operation of the machine and circuit as shown in Figure 24 is as follows:

With the parts as shown in this figure the ram 40 is to be lowered for operation on a work piece on its side of the work supporting table. The pump 90 is brought up to normal speed and then the valve mechanism 94 shifted to the position shown in Figure 24 by either of the handles 114 or 116. This connects the pressure in the conduit 92 with the conduit 131 to the upper end of the piston-valve mechanism 133 for shifting same to withdraw the locking plungers 156 and 157. As soon as said plungers are withdrawn the pressure in the pipe or conduit 131 is connected through the branch conduit 167 with the conduit 168 and the distributing valve mechanism 169. The pressure in the conduit 168 is connected with the conduit 210 and the valve mechanism 214 where the pressure is directed into the conduit 249 and the upper end of the cylinder 44 for causing the descent of the ram 40. The movement of the ram 40 downwardly exhausts the medium ahead of it out of the cylinder through the conduit 273 to the cylinder 45 and effects an elevation of the piston 44 therein and the ram 43 connected therewith. The upward movement of the piston 48 discharges the medium ahead of it through the conduit 250 to the valve mechanism 214. The said valve mechanism 214 connects the conduit 250 with conduit 213 and valve mechan'sm 169 where a connection is made with discharge conduits 208, 132 and 131 through the valve 94 to the sump 89.

This movement of the pistons continues until the dog 187 on the ram 40 engages the flipper 191 for shifting the valve mechanism to its second position, that to the left of that shown in Figure 24. This movement of the valve mechanism 169 connects the pressure conduit 168 with the conduit 209 which through the valve mechanism 240, still in the same position as before, connects with conduit 251 and pressure reducing valve 252, which, as above described, is connected with discharge conduits 253 and 132 and the sump 89. The pressure reducing valve 252 lowers the effective pressure in conduit 251 which is taken off through the conduit 254 to the valve mechanism 255. This valve mechanism is now in its second or inner position from that shown in Figure 24 since it was moved simultaneously with the movement of the valve mechanism 169 as above fully explained. This valve mechanism 255 therefore connects the conduit 254 with the conduit 271 and the right hand end of table indexing or oscillating cylinder 73 as seen in Figure 24, thereby effecting an oscillation of the table to its second operative position. The hydraulic medium ahead of the table indexing piston is forced therefrom through the conduit 270 to the valve mechanism 255 where it is connected through branch discharge conduit 272, conduit 132 to the sump 89. Disposed within the conduit 270 is an adjustable choke valve 309 which controls the flow of the medium through the said conduit and therefore controls the rate of actuation of the table indexing piston to avoid any sharp contacts between the parts when the table is fully indexed.

At the conclusion of the table indexing operation it, through the lever 233 and parts operated thereby, shifts the valve mechanism 214 to its second position or to the left of that shown in Figure 24. This movement of the valve mechanism now connects the conduit 209, which is under pressure, with the conduit 250 to the upper end of the cylinder 49 for causing a descent of the piston 48 therein and the ram 43. Movement of the ram 43 and piston 48 downwardly exhausts medium ahead of it through the conduit 273 to the cylinder 44 for elevating the piston 45' therein and the ram 40. This upward movement of the ram 40 and its piston exhausts the medium ahead of it through the conduit 249 to the valve mechanism 214 where it is connected with the conduit 211 and valve mechanism 169. The valve mechanism 169 connects the conduit 211 with the branch discharge conduits 208 and 132 and the sump 89. This movement of the rams again continues until the dog 188 associated with the ram 143 shifts the valve mechanism to the position shown in Figure 24.

At this time, with the valve mechanism 214 in its inner position from that shown, the pressure conduit 168 is connected through the valve mechanism 169 with conduit 210 and valve mechanism 214 with the conduit 251 and pressure reducing valve 252. The reduced pressure conduit 254 is now connected with the conduit 270 and the left hand end of the table indexing cylinder 73 for shifting same to the position shown in Figure 24. The medium ahead of the piston in the cylinder 73 is exhausted through the conduit 271, valve mechanism 255 and branch discharge conduit 272 with the conduit 132. Again at the conclusion of the indexing operation of the table the valve mechanism 214 is actuated this time to the position shown in Figure 24, whereupon a repetition of the cycle of operation as just described is had.

It is to be understood that if during the normal cycle of operation either of the pistons does not reach its upper limit of movement or overruns same the make-up valve mechanisms 274 and 275 are brought into operation for correcting the said mispositioning as above described. It will also be appreciated that should an emergency arise during the normal operation, requiring a shutdown of the machine, either of the handles 114 or 116 may be manually operated or the operator may merely give a kick with his foot to the kick plate 129, thereby stopping all movement of the machine. As soon as the pressure is removed from the conduit 131 the springs 160 immediately tend to shift the locking bolts 156 and 157 and their locking positions, thereby preventing any falling of the rams while idle.

In the modified machine shown primarily in Figures 18 to 23 inclusive and Figure 25 certain additional control valves and automatic control means are employed, being utilized for effecting a stopping in the operation of the machine at the conclusion of the tooling of each work piece unless the machine is reset by the operator prior to the completion of the said tooling of. the work piece. To effect this control of the work piece the starting and stopping valve mechanism 94 of Figure 24 is changed as shown in Figure 21. This modified starting and stopping valve mechanism includes a shaft 310 disposed in bearings provided by the valve casing 95 and takes the place of the shaft 110 of Figure 5. Mounted on the shaft 310 is a pair of valve actuators 311 and 312 having their outer or ball ends 313 respectively received in notches 314 and 315 formed in the valve stem 316. Depending from each of the actuators 311 and 312 is a finger 317 and 318 respectively engaging a shoulder associated with latch plungers 319 and 320. The latching surfaces or shoulders 321 and 322 respectively of latches 319 and 320 are spaced above one another as seen in Figures 20 and 21, particularly the latter. As will later be made clear retraction of one plunger, namely 319, and withdrawing of its latching surface 321 from the notch 323, in which each of the latching plungers is situated, permits the movement of the starting and stopping valve member 102 a distance equal to the difference between the latch faces 321 and 322.

Figure 22:
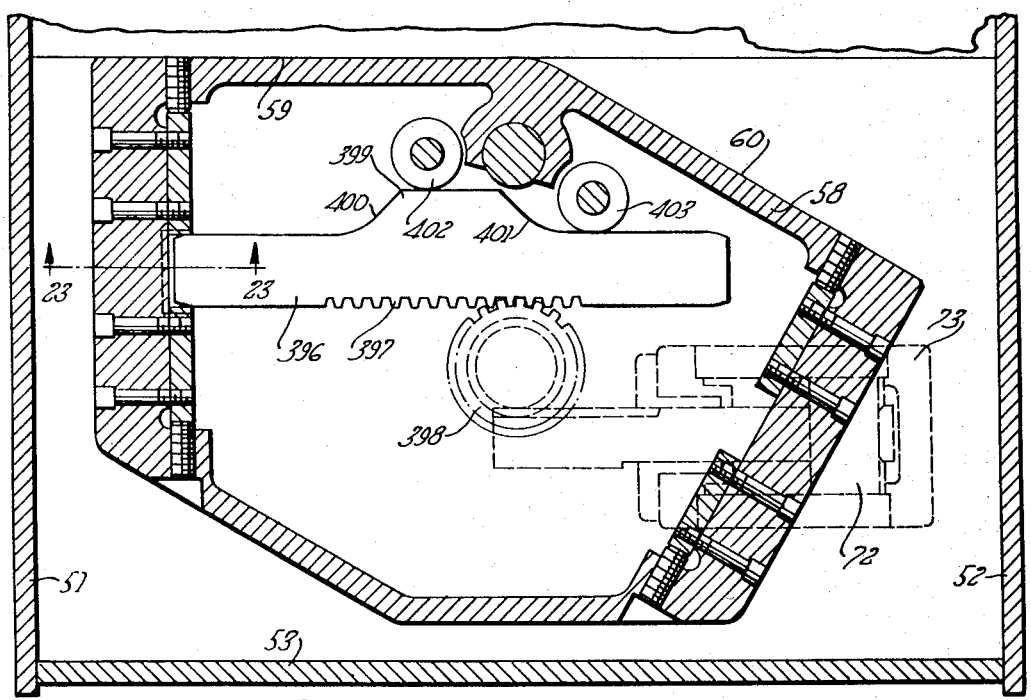
Figure 22 is a horizontal sectional view through the modified work supporting table indexing or actuating means.

Similar to the operation of the starting and stopping valve mechanism of the circuit shown in Figure 24 to initiate the operation of the machine, the valve actuators 311 and 312 are manually operated to shift the same to the position shown in Figures 21, 22 and 25. For this purpose the shaft 310 projects beyond the valve casing 95 to receive an arm 324 connected by a rod 325 with a lever 326 pivotally mounted at 327 to the side of the knee or table supporting housing. The handle 326 is oscillated about the pivot 327 in a clockwise direction or toward the column for thereby correspondingly actuating the valve shifters 311 and 312 and effecting an elevation of the starting and stopping valve member. As soon as the valve is raised to its proper position the latching plungers 319 and 320 are shifted by their respective springs 328 into the stem notch 323 and thereby hold the valve in its elevated position, it being understood that it is really the plunger 319 through its face 321 that does the normal latching of the valve in its starting position.

The said locking plungers 319 and 320 are adapted to be automatically withdrawn during the operation of the machine, and for this purpose they each have formed in their lower surface a notch 329 respectively receiving the ball end 330 of levers 331 and 332, the levers 332 being loosely pivotally mounted on a pivot shaft 333 carried by a plate 334 secured to the valve casing 94. The levers 331 and 332 have their respective lower ends 335 and 336 disposed ahead of piston plungers 337 and 338, each carried by an independent cylinder 339 formed in the cover plate 334. The piston plungers 337 and 338 are adapted to be actuated by hydraulic pressures during the operation of the machine as will later be made clear.

The starting and stopping valve member 102, in addition to being shifted by the handle 126, may be actuated by a foot treadle mechanism which, in fact, is normally employed to reset the valve as will later be made clear. This foot treadle mechanism comprises, see Figure 18, a plate 340 having its rear end pivotally connected at 341 to a lug 342 depending from the column of the machine. The front end of the plate 340 is pivoted at 343 to one end of a link 344 which extends downwardly and forwardly of the machine. The lower end of the link 344 is pivotally connected at 345 to a lever 346, oscillatably journaled on a stud 347 projecting from the side of the table housing or knee. Integral with the lever 346 is an arm 348 projecting toward the front of the machine beyond the table housing whereupon said arm 348 turns upwardly as at 349. Carried by the outer end of the arm 349 is a bar 350 extending entirely across the machine and having secured to its other end an arm 351 which is similar to the arm 348 and oscillatably mounted on a stud 352 projecting from the table housing.

Mounted above the plate 340 and contacting with the upper surface thereof is a pin or plunger 353 disposed for sliding movement through a bore in a plug 354 threadedly carried by the lower end of the valve housing 94. The pin 353 is disposed in axial alignment with the valve member 102 and contacts on its upper surface with the lower end of the valve stem 316. From the foregoing it will be noted that pressure on the bar 350, as by the operator stepping on same, will oscillate the arm 348 and lever 346 in a counterclockwise direction about the pivot 347. This movement shifts the link 344 rearwardly and wardly for actuating the plate 340 in a clockwise direction about its pivot 341 and thereby through the pin or plunger 353 elevating the starting and stopping valve member 102. As soon as the valve member is in its uppermost position the locking plungers 319 and 320 latch the valve in position. In order to hold the treadle mechanism in its uppermost position the arm 348 has connected therewith one end of a spring 355, the other end of which is anchored at 356 to the side of the table housing.

Figure 6:
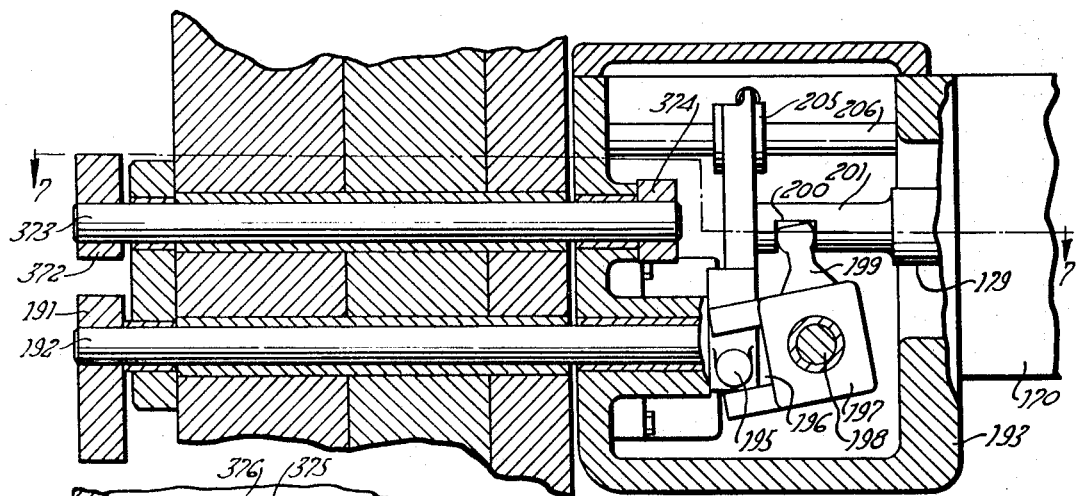
Figure 6 is a fragmentary sectional view taken on line 6—6 on Figure 2.
Figure 10:
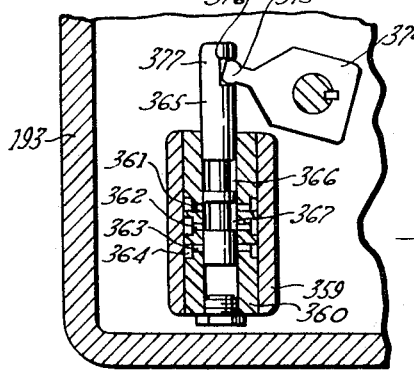
Figure 10 is a sectional view taken on line 10—10 of Figure 7.

As seen in Figure 25, the plunger 337 has the rear end of its cylinder connected by a pipe or conduit 357 with a control valve mechanism indicated generally in Figure 25 by the numeral 358. The valve mechanism 358 is shown structurally in Figure 10 and as there shown comprises a valve casing 359 secured to the forward wall of the housing 193 associated with the valve mechanism supported by the rear faces of column plates 33 and 34, above referred to and described in detail. Pressed into the valve casing 359 is a valve bushing 360 having formed therethrough a plurality of sets of radial ports 361, 362 and 363, each set being encircled by a similar circumferential groove 364 formed in the exterior of the bushing 360. Disposed within the bore in the bushing 360 is a valve member 365 having formed thereon reduced portions 366 and 367 forming cannelures for connecting in one position the ports 361 and 362 and in a second position the ports 362 and 363. The valve member 365 is adapted to be actuated to its two operative positions by the broach rams, one ram shifting the valve to the position shown on the drawings and the other ram shifting the valve to its second operative position. To effect this operation of the valve, see Figure 2, the ram dogs 187 and 188 have respectively projecting therefrom a pin 368 and 369 for respectively engaging ears 370 and 371 of a flipper member 372. The flipper 372 is pinned or otherwise secured to the outer end of an oscillatable rod 373 rotatably journaled in bearings provided by the column as seen in Figure 6. For convenience the rod 373 is disposed just above the main control rod 192. The rod 373, similar to the rod 192, projects into the housing 193 of the main control valve casing 170 where it has secured to it a valve shifter 374. The valve shifter 374 is provided with a ball shaped arm 375 received in a transverse notch 376 in the stem 377 of the valve member 365.

As seen in Figure 25 the conduit 357 terminates at the ports 362 while the ports 363 have connected therewith one end of a pipe or conduit 378 terminating at its other end in branch pressure conduit 379 which extends from the main pressure conduit 92. Connected with the ports 361 is one end of a pipe or conduit 380 terminating at its other end in a pipe or conduit 381 which empties into the return conduit 293 from the make-up valve above described.

The second release plunger 338 has connected therewith one end of a pipe or conduit 382 which terminates in a control valve mechanism indicated generally in Figure 25 by the numeral 383. This valve mechanism is similar to the valve mechanism 358 and is shown structurally in Figure 9. As shown therein, the said valve control mechanism comprises a casing 384 enclosing a valve bushing 385 having a plurality of sets of radial ports 386, 387 and 388 therein. Disposed within the bushing 385 is a valve member 389 adapted to connect the said ports in different combinations when in different positions relative thereto. The valve member 389 is provided in its stem 390 with a transverse slot 391 receiving the ball end 392 of a valve actuator 393. The valve actuator 393 is adapted to be actuated simultaneously with the operation of the main control valve mechanisms 169 and 255 and is therefore operated through the same mechanism including the ram dogs 187 and 188 and flipper 190. For this reason the valve actuator 393 is keyed or otherwise secured to the shaft 198 to which the valve shifter members 199 and 267 are secured.

As seen from Figure 25 the pipe or conduit 382 from the plunger 338 connects with the ports 387 while the ports 386 are connected by a pipe or conduit 394 with the drain system or conduit 381. The ports 388 are connected by a pipe or conduit 395 with the branch pressure conduit 379.

The operation of the modified control mechanism will now be described as supplementary to the operation of the circuit shown in Figure 24 since the circuit in Figure 25 operates the same except as modified by the valve mechanisms 358 and 363. As shown in Figure 25, the two release plungers 337 and 338 are connected to the drain, therefore have no pressure thereon and the starting and stopping valve is in the position determined by the higher face 321 of the latching plunger 319. As with the circuit shown in Figure 24 the left hand ram 40 is to be lowered and the right hand ram 43 raised.

The rams are set in motion as described above and the right hand ram through its dog pin 369 will shortly after its initial movement engage the ear 371 of the flipper 372 for lowering the valve member of the valve mechanism 358 as seen in Figure 25. This movement of the valve will be such as to connect the pressure conduit 378 with the plunger conduit 357 through the ports 363 and 362, thereby depressing the said plunger and withdrawing the latch 319, permitting a slight downward movement of the starting and stopping valve member 102 to the position determined by the face 322 of the second latch 320. The movement of the valve member 102 as just effected will be insufficient to change any porting with respect thereto and the machine will continue to function. The valve member of the valve mechanism 358 does not, however, stop in the position to maintain pressure on the plunger 337 but instead is shifted entirely across the pressure port 333 to again connect the ports 362 and 361; this time, however, by the cannelure 366 instead of the cannelure 367 as was the initial setting of this valve.

The operator is now loading a work piece in the work fixture from which the completed work piece has been removed and if he should complete the clamping of the work piece prior to the completion of the tooling operation as being effected by the ram 40, he will step on the bar or treadle 350 for shifting the valve member to the position shown in the drawings. With the parts in this position at the conclusion of the tooling operation, as being effected by the ram 40, the cycle will be repeated through the ram 43. If, however, the operator does not step on the treadle 350 prior to the conclusion of the tooling operation now in progress the operation of the control valves by the dog 187 will shift the valve member of valve mechanism 383, thereby connecting the pressure conduit 395 with the conduit 382 of the plunger 338. This, of course, will cause the retraction of the second latch plunger 320 and since the first latch 319 is already retracted the starting and stopping valve member 102 will shift to a stopping position and stop the operation of the machine. The operator will then be required to either utilize the starting handle 326 or shift the valve the entire distance by the treadle 350.

It will be appreciated that the latching plungers 319 and 320 are retracted during each cycle of operation of the machine but if the starting and stopping valve is reset prior to the completion of the cycle the retraction of the second latch 320 in no wise releases the starting and stopping valve member, since it, in effect, is not in latching operation at this time. It should also be noted that the valve member of the valve mechanism 383 does not remain in the position for connecting pressure to its knock-out plunger for any appreciable time, but merely passes the pressure port to, in effect, deliver a shot of pressure thereto.

It will also be noted that in case of an emergency the machine may be instantly stopped by actuating the handle 326 outwardly or in a clockwise direction about its pivot 327 for simultaneously withdrawing both latching plungers 319 and 320, since the actuators are both secured to the common shaft 310.

From the foregoing it is believed now evident that there has been provided a machine which may be set in operation for effecting continuous production or which will stop at the conclusion of the tooling of each work piece if the second work piece is not in condition to be immediately operated upon.

In the modified table actuating mechanism shown in Figure 22 use is made of the locking bar for effecting the oscillation of the table instead of a separate table actuating means. Also instead of the locking bar being intermittently shifted for a short distance the said bar is continuously shifted for first releasing the hold down clamp and then effecting the indexing of the table. Specifically, the mechanism shown in Figure 22 comprises a bar 396 having formed in one side thereof rack teeth 397 meshing with the teeth of a gear 398 secured to the upper end of the vertical shaft 61. The shaft 61 is rotated by the piston and cylinder mechanism 72—73 as above explained. On the rear side of the bar 396 it is provided with a boss or lug 399 from opposite ends of which extend cam faces 400 and 401. The said cams 400 and 401 respectively engage with anti-friction rollers 402 and 403 disposed on each side of the trunnion 57.

It is believed that the operation of the modified table indexing mechanism is readily understood since a movement of the piston toward the left, as seen in Figure 22, will shift the bar 396 toward the right. Due to the lost motion between the cam face 401 and roller 403 this movement will first unclamp the table as effected by the left hand end of the bar, whereupon the cam face 401 will engage the roller 403 and oscillate a table in a counterclockwise direction. By the time the roller 403 reaches the upper end of the cam face 401 the table is completely indexed, whereupon the bar 396 is further actuated to clamp the table in its indexed position. Reverse movement of the piston 72 or to the right, will, of course, reversely actuate the parts for again indexing the table to the position shown in the drawings.

What is claimed is:

1. In a duplex broach of the class described the combination of a column, a pair of broach rams mounted thereon for reciprocating movement relative thereto, independent hydraulic means for effecting the said reverse movements of the rams, an hydraulic circuit, a work supporting table on said column for alternately presenting a work piece to said rams, hydraulic means for effecting the actuation of the table, and a valve operable by said rams for effecting the oscillation of the table at the conclusion of each stroke thereof.

2. In a duplex broach of the class described the combination of a column, a pair of broach rams mounted thereon for reciprocating movement relative thereto, independent hydraulic means for effecting the said reverse movements of the rams, an hydraulic circuit, a work supporting table on said column for alternately presenting a work piece to said rams, hydraulic means for effecting the actuation of the table, a valve operable by said rams for effecting the oscillation of the table at the conclusion of each stroke thereof, and a second valve for reversing the direction of movement of the rams and operable by the table.

3. In a duplex broach of the class described the combination of a column, a pair of broach rams mounted thereon for reciprocating movement relative thereto, independent hydraulic means for effecting the said reverse movements of the rams, an hydraulic circuit, a work supporting table on said column for alternately presenting a work piece to said rams, hydraulic means for effecting the actuation of the table, a valve operable by said rams for effecting the oscillation of the table at the conclusion of each stroke thereof, a second valve for reversing the direction of movement of the rams and operable by the table, and means in said circuit ahead of the table actuating means for reducing the pressure therein which effects the operation of the table.

4. In a duplex broach of the class described the combination of a column, a pair of broach rams mounted thereon for reciprocating movement relative thereto, independent hydraulic means for effecting the said reverse movements of the rams, an hydraulic circuit, a work supporting table on said column for alternately presenting a work piece to said rams, hydraulic means for effecting the actuation of the table, a valve operable by said rams for effecting the oscillation of the table at the conclusion of each stroke thereof, a second valve for reversing the direction of movement of the rams and operable by the table, means in said circuit ahead of the table actuating means for reducing the pressure therein which effects the operation of the table, and means controlling the rate of actuation of the table.

5. In a duplex broach of the class described the combination of a column, a pair of broach rams thereon for reciprocating movement in reverse directions relative thereto, one of said rams operating in one direction through a cutting stroke while the other is operating in a reverse direction through an idle stroke, independent hydraulic actuating means for actuating each of said rams in one direction, an hydraulic circuit for actuating said hydraulic means in one direction, means for hydraulically connecting said rams to effect the actuation of the hydraulic means in the second direction through the first hydraulic means, means for individually locking the rams in position when the hydraulic circuit is shut off, and a single means for simultaneously withdrawing said locks when the circuit is again operated.

6. In a duplex broach of the class described the combination of a column, a pair of broach rams thereon for reciprocating movement in reverse directions relative thereto, one of said rams operating in one direction through a cutting stroke while the other is operating in a reverse direction through an idle stroke, independent hydraulic actuating means for actuating each of said rams in one direction, an hydraulic circuit for actuating said hydraulic means in one direction, means for hydraulically connecting said rams to effect the actuation of the hydraulic means in the second direction through the first hydraulic means, a work supporting table carried by the column for alternately presenting a work piece to the rams during their operative strokes, and a valve in the hydraulic circuit operable in reverse directions by the rams when they reach the end of their cutting stroke for effecting the operation of the work supporting table.

7. In a duplex broach of the class described the combination of a column, a pair of broach rams thereon for reciprocating movement in reverse directions relative thereto, one of said rams operating in one direction through a cutting stroke while the other is operating in a reverse direction through an idle stroke, independent hydraulic actuating means for actuating each of said rams in one direction, an hydraulic circuit for actuating said hydraulic means in one direction, means for hydraulically connecting said rams to effect the actuation of the hydraulic means in the second direction through the first hydraulic means, a work supporting table carried by the column for alternately presenting a work piece to the rams during their operative strokes, a valve in the hydraulic circuit operable in reverse directions by the rams when they reach the end of their cutting stroke for effecting the operation of the work supporting table, a second valve in said circuit operable in reverse directions by the work supporting table at the conclusion of its operation for alternately actuating the rams through their cutting strokes.

8. In a duplex broach of the class described the combination of a column, a pair of broach rams thereon for reciprocating movement in reverse directions relative thereto, one of said rams operating in one direction through a cutting stroke while the other is operating in a reverse direction through an idle stroke, independent hydraulic actuating means for actuating each of said rams in one direction, an hydraulic circuit for actuating said hydraulic means in one direction, means for hydraulically connecting said rams to effect the actuation of the hydraulic means in the second direction through the first hydraulic means, said rams being actuable in timed relation and having a definite position at one end of their inoperative strokes, a valve in the hydraulic circuit for supplying make-up fluid to said rams if they do not reach the said upper limit of their idle stroke, and means carried by one of said rams for operatively positioning the said valve.

9. In a broaching machine the combination of a broach ram, a work support, hydraulic means including a fluid under pressure for effecting the operation of the broach ram, a starting and stopping valve for controlling the flow of the hydraulic medium, manual means for shifting said valve to its starting position, mechanical means for shifting said valve to a stop position, means for latching the valve in its starting position, and a control circuit including hydraulically operated means for releasing the latch whereby the mechanical means effects the shifting of the valve.

10. In a broaching machine the combination of a broach ram, a work support, hydraulic means including a fluid under pressure for effecting the operation of the broach ram, a starting and stopping valve for controlling the flow of the hydraulic medium, manual means for shifting said valve to its starting position, mechanical means for shifting said valve to a stop position, means for latching the valve in its starting position, means for releasing the latch whereby the mechanical means effects the shifting of the valve, including pressure operable means, and a valve operable by the ram for connecting the pressure medium with said pressure operable latch released means.

11. In a broaching machine of the class described the combination of a pair of broach rams adapted to be reciprocated in opposite directions, one of said rams passing through its cutting stroke while the other is passing through its idle stroke, hydraulic means including an hydraulic medium under pressure for effecting the reverse reciprocations of the rams, a starting and stopping valve having an operative position in which a flow of hydraulic medium is had and a stopping position in which the flow of the medium is stopped, means for shifting the valve to its starting position, a pair of latches operable in sequence for latching the valve in its open position, and means operable by the rams while respectively traveling through their cutting and idle strokes for rendering the latches inoperative.

12. In a broaching machine of the class described the combination of a pair of broach rams adapted to be reciprocated in opposite directions, one of said rams passing through its cutting stroke while the other is passing through its idle stroke, hydraulic means including an hydraulic medium under pressure for effecting the reverse reciprocations of the rams, a starting and stopping valve having an operative position in which a flow of hydraulic medium is had and a stopping position in which the flow of the medium is stopped, means for shifting the valve to its starting position, a pair of latches operable in sequence for latching the valve in its open position, independent means for each of said latches for releasing same, and independent control means operable by said rams for actuating the latch release means.

13. In a broaching machine of the class described the combination of a pair of broach rams adapted to be reciprocated in opposite directions, one of said rams passing through its cutting stroke while the other is passing through its idle stroke, hydraulic means including an hydraulic medium under pressure for effecting the reverse reciprocations of the rams, a starting and stopping valve having an operative position in which a flow of hydraulic medium is had and a stopping position in which the flow of the medium is stopped, means for shifting the valve to its starting position, a pair of latches operable in sequence for latching the valve in its open position, independent means for each of said latches for releasing same, independent control means operable by said rams for actuating the latch release means, and means operable between the operation of the two latch releasing means for again rendering the latch means operative.

14. In a broaching machine of the class described the combination of a pair of broach rams adapted to be reciprocated in opposite directions, one of said rams passing through its cutting stroke while the other is passing through its idle stroke, hydraulic means including an hydraulic medium under pressure for effecting the reverse reciprocations of the rams, a starting and stopping valve having an operative position in which a flow of hydraulic medium is had and a stopping position in which the flow of the medium is stopped, means for shifting the valve to its starting position, a pair of latches operable in sequence for latching the valve in its open position, independent means for each of said latches for releasing same, independent control means operable by said rams for actuating the latch release means, and manually operable means for rendering the first released latch means operative prior to the release of the second latch means.

15. In a duplex broach the combination of a pair of reciprocable rams operable simultaneously in opposite directions whereby one ram is passing through its cutting stroke while the other is passing through an idle stroke, an oscillatable table for presenting a work piece to the broach ram passing through its cutting stroke while a second work piece is being loaded thereon for the ram passing through its idle stroke, hydraulic means including an hydraulic medium for effecting reciprocation of the rams, a starting and stopping valve for controlling the flow of the hydraulic medium, said valve having two open starting positions and one closed stopping position, an independent latch mechanism for holding the valve in its starting position, means operable by one ram while passing through its idle stroke for releasing one latch mechanism, and means operable by the other ram at the conclusion of its cutting stroke for releasing the second latch.

16. In a duplex broach the combination of a pair of reciprocable rams operable simultaneously in opposite directions whereby one ram is passing through its cutting stroke while the other is passing through an idle stroke, an oscillatable table for presenting a work piece to the broach ram passing through its cutting stroke while a second work piece is being loaded thereon for the ram passing through its idle stroke, hydraulic means including an hydraulic medium for effecting reciprocation of the rams, a starting and stopping valve for controlling the flow of the hydraulic medium, said valve having two open starting positions and one closed stopping position, an independent latch mechanism for holding the valve in its starting position, means operable by one ram while passing through its idle stroke for releasing one latch mechanism, means operable by the other ram at the conclusion of its cutting stroke for releasing the second latch, and means operable upon release of said latch means for shifting the starting and stopping valve to its stop position.

17. In a duplex broach the combination of a pair of reciprocable rams operable simultaneously in opposite directions whereby one ram is passing through its cutting stroke while the other is passing through an idle stroke, an oscillatable table for presenting a work piece to the broach ram passing through its cutting stroke while a second work piece is being loaded thereon for the ram passing through its idle stroke, hydraulic means including an hydraulic medium for effecting reciprocation of the rams, a starting and stopping valve for controlling the flow of the hydraulic medium, said valve having two open starting positions and one closed stopping position, an independent latch mechanism for holding the valve in its starting position, means operable by one ram while passing through its idle stroke for releasing one latch mechanism, means operable by the other ram at the conclusion of its cutting stroke for releasing the second latch, and means for rendering the first latch means operative prior to the release of the second latch means.

18. In a broaching machine of the character described, the combination with a pair of broach operating rams of means for effecting alternate reciprocations of the individual rams in a tooling and retracting stroke, a shiftable table having individual work receiving portions presentable to the respective rams during their tooling movement and retractable with respect thereto during the retracting stroke of the ram, means actuated by movement of one ram to effect shifting of the table, retracting its work receiving portion with respect to the moving ram and positioning the other portion of the table in operative relation to the alternate rams, means activated by movement of the table for effecting a tooling movement of the second ram with respect to the table, means for stopping the ram movement at any point in the stroke thereof, and additional means for effecting reversal of the ram at said point independent of the cyclic operation of the machine.

19. In a broach of the character described including a pair of broach rams oppositely reciprocable through tooling and retracting strokes, and a shiftable work table having work receiving portions alternately presentable to the respective broach rams during their tooling stroke, and means for effecting a cyclic movement of alternate presentations of a work piece to one of the rams, a broaching stroke of the ram and a subsequent presentation of a work piece to the other ram with broaching stroke thereof, the combination with a shiftable control device for initiating or discontinuing the cyclic operation of the parts, means for locking said shiftable control device in position to effect cyclic operation of the machine, and an automatic release mechanism for the control device including a first part actuated by movement of one of the rams and a second release device operable by the other of said rams whereby a time interval is provided between effective actuations of the respective releasing devices.

20. In a broach of the character described including a pair of broach rams oppositely reciprocable through tooling and retracting strokes, and a shiftable work table having work receiving portions alternately presentable to the respective broach rams during their tooling stroke and means for effecting a cyclic movement of alternate presentations of a work piece to one of the rams, a broaching stroke of the ram and a subsequent presentation of a work piece to the other ram with broaching stroke thereof, the combination with a shiftable control device for initiating or discontinuing the cyclic operation of the parts, means for locking said shiftable control device in position to effect cyclic operation of the machine, an automatic release mechanism for the control device including a first part actuated by movement of one of the rams, a second release device operable by the other of said rams whereby a time interval is provided between effective actuations of the respective releasing devices, and means for resetting the control device during the time interval whereby the automatic release is rendered ineffective.

21. In a machine of the character described, the combination with a pair of alternatively effective broach rams and means for effecting reciprocation of said rams, of a control device shiftable to start or stop movement of the rams, successively actuable devices for determining shifting of the control device to a stop position, means effective on movement of one of the rams in its initial stage for operating certain of said successively operable devices, and means effective during subsequent movement of the opposite ram additionally to actuate the successively operable devices whereby discontinuance of movement of both of said rams is effected.

22. In a machine of the character described, the combination with a pair of alternatively effective broach rams and means for effecting reciprocation of said rams, of a control device shiftable to start or stop movement of the rams, successively actuable devices for determining shifting of the control device to a stop position, means effective on movement of one of the rams in its initial stage for operating certain of said successively operable devices, means effective during subsequent movement of the opposite ram additionally to actuate the successively operable devices whereby discontinuance of movement of both of said rams is effected, and means to compensate for the actuation of the first of said successively operable devices whereby the latter thereof is rendered ineffectual as respects the shiftable control device.

MILLARD ROMAINE.
ERWIN G. ROEHM.